(12) United States Patent
Zhang et al.

(10) Patent No.: US 10,680,948 B2
(45) Date of Patent: *Jun. 9, 2020

(54) HYBRID PACKET PROCESSING

(71) Applicant: Nicira, Inc., Palo Alto, CA (US)

(72) Inventors: Ronghua Zhang, San Jose, CA (US);
Teemu Koponen, San Francisco, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,754

(22) Filed: Jul. 21, 2018

(65) Prior Publication Data
US 2018/0331954 A1    Nov. 15, 2018

Related U.S. Application Data

(63) Continuation of application No. 15/421,662, filed on Feb. 1, 2017, now Pat. No. 10,033,640, which is a
(Continued)

(51) Int. Cl.
*H04L 12/741* (2013.01)
*H04L 12/721* (2013.01)
(Continued)

(52) U.S. Cl.
CPC ............ *H04L 45/745* (2013.01); *H04L 45/38* (2013.01); *H04L 45/54* (2013.01); *H04L 45/742* (2013.01); *H04L 47/33* (2013.01)

(58) Field of Classification Search
CPC ....... H04L 45/38; H04L 45/54; H04L 45/742; H04L 45/745; H04L 47/33; H04L 1/0016;
(Continued)

(56) References Cited

U.S. PATENT DOCUMENTS 5,504,921 A    4/1996 Dev et al.
5,550,816 A    8/1996 Hardwick et al.
(Continued)

FOREIGN PATENT DOCUMENTS

EP         1154601 A1    11/2001
JP      2003069609 A     3/2003
(Continued)

OTHER PUBLICATIONS

Anwer, Muhammad Bilal, et al., "Building a Fast, Virtualized Data Plane with Programmable Hardware," Aug. 17, 2009, 8 pages, VISA'09, ACM, Barcelona, Spain.
(Continued)

*Primary Examiner* — Kan Yuen
(74) *Attorney, Agent, or Firm* — Adeli LLP

(57) ABSTRACT

Some embodiments provide a method of processing an incoming packet for a managed forwarding element that executes in a host to forward packets in a network. The method performs a lookup into a forwarding table to identify a flow entry matched by the incoming packet. The flow entry specifies a high-level action to perform on the incoming packet. The method provides packet data to a module executing separately from the managed forwarding element in the host. The module performs a set of processes in order to identify a set of low-level actions for the managed forwarding element to perform on the incoming packet without additional lookups into the forwarding table. The method receives data from the separate module specifying the set of low-level actions. The method performs the set of low-level actions on the incoming packet in order to further process the packet.

18 Claims, 12 Drawing Sheets

Related U.S. Application Data continuation of application No. 14/320,448, filed on Jun. 30, 2014, now Pat. No. 9,571,386.

(60) Provisional application No. 61/843,878, filed on Jul. 8, 2013.

(51) Int. Cl.
*H04L 12/747* (2013.01)
*H04L 12/801* (2013.01)

(58) Field of Classification Search
CPC . H04L 63/123; H04L 63/126; H04L 63/1408; H04L 63/1425
See application file for complete search history.

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 6,104,699 A | 8/2000 | Holender et al. |
| 6,141,738 A | 10/2000 | Munter et al. |
| 6,219,699 B1 | 4/2001 | McCloghrie et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,606,260 B2 | 10/2009 | Oguchi et al. |
| 7,633,955 B1 | 12/2009 | Saraiya et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,817,549 B1 * | 10/2010 | Kasralikar .......... H04L 63/1408 370/232 |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,432,902 B2 | 4/2013 | Olsen |
| 8,456,984 B2 | 6/2013 | Ranganathan et al. |
| 8,504,718 B2 | 8/2013 | Wang et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Sakai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,762,501 B2 | 6/2014 | Kempf et al. |
| 8,838,743 B2 | 9/2014 | Lewites et al. |
| 9,571,386 B2 | 2/2017 | Zhang et al. |
| 10,033,640 B2 | 7/2018 | Zhang et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0236813 A1 | 12/2003 | Abjanic |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0182853 A1 | 8/2005 | Lewites et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | Heer |
| 2008/0240095 A1 | 10/2008 | Basturk |
| 2009/0150527 A1 | 6/2009 | Tripathi et al. |
| 2009/0292858 A1 | 11/2009 | Lambeth et al. |
| 2010/0131636 A1 | 5/2010 | Suri et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |

(56) References Cited

U.S. PATENT DOCUMENTS

| | | | |
|---|---|---|---|
| 2011/0085563 | A1 | 4/2011 | Kotha et al. |
| 2011/0128959 | A1 | 6/2011 | Bando et al. |
| 2011/0194567 | A1 | 8/2011 | Shen |
| 2011/0202920 | A1 | 8/2011 | Takase |
| 2011/0261825 | A1 | 10/2011 | Ichino |
| 2011/0299413 | A1 | 12/2011 | Chatwani et al. |
| 2011/0299534 | A1 | 12/2011 | Koganti et al. |
| 2011/0299537 | A1 | 12/2011 | Saraiya et al. |
| 2011/0305167 | A1 | 12/2011 | Koide |
| 2011/0317559 | A1 | 12/2011 | Kern et al. |
| 2012/0079478 | A1 | 3/2012 | Galles et al. |
| 2012/0182992 | A1 | 7/2012 | Cowart et al. |
| 2013/0024579 | A1 | 1/2013 | Zhang et al. |
| 2013/0044636 | A1* | 2/2013 | Koponen ........... H04L 47/12 370/254 |
| 2013/0044762 | A1 | 2/2013 | Casado et al. |
| 2013/0054761 | A1 | 2/2013 | Kempf et al. |
| 2013/0058346 | A1 | 3/2013 | Sridharan et al. |
| 2013/0163427 | A1 | 6/2013 | Beliveau et al. |
| 2013/0163475 | A1 | 6/2013 | Beliveau et al. |
| 2013/0339544 | A1 | 12/2013 | Mithyantha |
| 2014/0019639 | A1 | 1/2014 | Ueno |
| 2014/0115578 | A1 | 4/2014 | Cooper et al. |

FOREIGN PATENT DOCUMENTS

| | | |
|---|---|---|
| JP | 2003124976 A | 4/2003 |
| JP | 2003318949 A | 11/2003 |
| WO | 2012126488 A1 | 9/2012 |

OTHER PUBLICATIONS

Author Unknown, "Open vSwitch, An Open Virtual Switch," Dec. 30, 2010, 2 pages, Cisco Systems, Inc.

Author Unknown, "OpenFlow Switch Specification, Version 0.9.0 (Wire Protocol 0x98)," Jul. 20, 2009, 36 pages, Open Networking Foundation.

Author Unknown, OpenFlow Switch Specification, Version 1.0.0 (Wire Protocol 0x01), Dec. 31, 2009, 42 pages, Open Networking Foundation.

Author Unknown, "OpenFlow Switch Specification, Version 1.1.0 Implemented (Wire Protocol 0x02)," Feb. 28, 2011, 56 pages, Open Networking Foundation.

Casado, Martin, et al. "Ethane: Taking Control of the Enterprise," Sigcomm'07, Aug. 27-31, 2007, 12 pages, ACM, Kyoto, Japan.

Curtis, Andrew R., et al., "DevoFlow: Scaling Flow Management for High-Performance Networks," SIGCOMM '11, Aug. 15-19, 2011, pp. 254-265, ACM.

Das, Saurav, et al., "Simple Unified Control for Packet and Circuit Networks," Month Unknown 2009, 2 pages, IEEE.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Fernandes, Natalia C., et al., "Virtual Networks: Isolation, Performance, and Trends," Annals of Telecommunications, Oct. 7, 2010, 17 pages, vol. 66, Institut Telecom and Springer-Verlag, Paris.

Foster, Nate, et al. "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, 6 pages, vol. 39, No. 2.

Gude, Natasha, et al., "NOX: Towards an Operating System for Networks," ACM SIGCOMM Computer Communication Review, Jul. 2008, 6 pages, vol. 38, No. 3, ACM.

Hinrichs, Timothy L., et al., "Practical Declarative Network Management," WREN'09, Aug. 21, 2009, 10 pages, Barcelona, Spain.

Koponen, Teemu, et al., "Network Virtualization in Multi-tenant Datacenters," Technical Report TR-2013-001E, Aug. 2013, 22 pages, VMware, Inc., Palo Alto, CA, USA.

Koponen, Teemu, et al., "Onix: A Distributed Control Platform for Large-scale Production Networks," In Proc. OSDI, Oct. 2010, 14 pages.

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo, Boon Thau, et al., "Implementing Declarative Overlays," In Proc. of SOSP, Oct. 2005, 16 pages, Brighton, UK.

Matsumoto, Nobutaka, et al., "LightFlow: Speeding Up GPU-based Flow Switching and Facilitating Maintenance of Flow Table," 2012 IEEE 13th International Conference on High Performance Switching and Routing, Jun. 24, 2012, 6 pages, IEEE.

McKeown, Nick, et al., "OpenFlow: Enabling Innovation in Campus Networks," ACS SIGCOMM Computer Communication Review, Apr. 2008, 6 pages, vol. 38, No. 2.

Nygren, Anders, et al., OpenFlow Switch Specification, Version 1.3.4 (Protocol version 0x04), Mar. 27, 2014, 84 pages, Part 1 of 2, Open Networking Foundation.

Nygren, Anders, et al., OpenFlow Switch Specification, Version 1.3.4 (Protocol version 0x04), Mar. 27, 2014, 87 pages, Open Networking Foundation. (Part 2 of 2).

Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.

Pfaff, Ben, et al., "OpenFlow Switch Specification," Sep. 6, 2012, 128 pages, The Open Networking Foundation.

Pfaff, Ben, et al., "The Open vSwitch Database Management Protocol," draft-pfaff-ovsdb-proto-00, Aug. 20, 2012, 34 pages, Nicira, Inc., Palo Alto, California, USA.

Pfaff, Ben., et al., "Extending Networking into the Virtualization Layer," Proc. of HotNets, Oct. 2009, 6 pages.

Popa, Lucian, et al., "Building Extensible Networks with Rule-Based Forwarding," In USENIX OSDI, Month Unknown 2010, 14 pages.

Sherwood, Rob, et al., "Carving Research Slices Out of Your Production Networks with OpenFlow," ACM SIGCOMM Computer Communications Review, Jan. 2010, 2 pages, vol. 40, No. 1.

Sherwood, Rob, et al., "FlowVisor: A Network Virtualization Layer," Oct. 14, 2009, 15 pages, OPENFLOW-TR-2009-1.

Tavakoli, Arsalan, et al., "Applying NOX to the Datacenter," Proc. HotNets, Month Unknown 2009, 6 pages.

Yu, Minlan, et al., "Scalable Flow-Based Networking with DIFANE," In Proc. SIGCOMM, Aug. 2010, 16 pages.

\* cited by examiner

Ingress ACL

| (in_port=P, src_mac=M1, dst_mac=M2) => drop |
|---|
| (in_port=P, src_mac=M1, dst_mac=M3) => accept |
| ... |

L2 Forwarding

| (dst_mac=M2) => output: Q |
|---|
| (dst_mac=M3) => output: Q |
| ... |

Egress ACL

| (out_port=Q, dst_mac=M3) => drop |
|---|
| (out_port=Q, dst_mac=M2) => accept |
| ... |

*Figure 1*
(Prior Art)

HYBRID PACKET PROCESSING

CLAIM OF BENEFIT TO PRIOR APPLICATIONS

This application is a continuation application of U.S. patent application Ser. No. 15/421,662, filed Feb. 1, 2017, and now published as U.S. Patent Publication 2017/0142011. U.S. patent application Ser. No. 15/421,662 is a continuation of U.S. patent application Ser. No. 14/320,448, filed Jun. 30, 2014, now issued as U.S. Pat. No. 9,571,386. U.S. patent application Ser. No. 14/320,448 claims the benefit of U.S. Provisional Application 61/843,878, filed Jul. 8, 2013. U.S. patent application Ser. No. 15/421,662, now published as U.S. Patent Publication 2017/0142011, U.S. patent application Ser. No. 14/320,448, now issued as U.S. Pat. No. 9,571,386, and U.S. Provisional Patent Application 61/843,878 are incorporated herein by reference.

BACKGROUND

All network elements—switches and routers, virtual or physical—have one ultimate task to fulfill, which is to forward incoming packets to a next element or a next hop on their way to the destinations. In some cases, the determination as to which next hop leads a packet towards an eventual destination depends on the current state of network. In these cases, the forwarding elements promptly react to the changes in the state of the network (e.g., configuration changes as well as to any network failures) by re-computing the forwarding rules as necessary. The division of functionalities within modern switches and routers into data plane and control plane reflects the two aspects of the operations of the switches and routers. That is, data plane forwards packets according to the instructions, which control plane computes and provides based on the network and configuration changes that the control plane observes.

In traditional physical networks, the control plane implementation is distributed over the network elements and the network elements all participate in a distributed routing and/or switching protocol to compute the forwarding instructions for their local data planes. In some software-defined datacenters, a centralized controller cluster replaces the distributed protocols in order to avoid the complications of developing the distributed protocols and implementing control with pure distributed algorithms. That is, in these datacenters, the controllers provide the network elements with up-to-date forwarding instructions.

A physical network device executes a processing pipeline to process packets. At each step of the pipeline, the physical network device looks up a lookup table to find an instruction to execute, using a combination of various packet header fields and some metadata (e.g., the result of executing the previous step of the pipeline). This lookup operation is challenging for the generic central processing units (CPUs) to process at high speed. Hence, the physical network devices tend to rely on special hardware in their data planes, and use generic CPUs only for running their control planes. Control plane programs use special-purpose application-specific integrated circuits (ASICs) to execute the packet forwarding pipeline. The ASICs use ternary content addressable memories (TCAMs) to provide constant-time longest-prefix matches and ACL lookups at rates sufficient for forwarding packets at line speed. FIG. 1 is an example of a simple layer 2 (L2) pipeline that include three lookup tables—an ingress access control list (ACL), a layer 2 (L2) forwarding table, and an egress ACL.

However, in a datacenter, enterprise application workloads (e.g., virtual machines that use enterprise applications) need networking functionalities beyond the standard Internet Protocol (IP) connectivity (as do other public datacenter VMs, in some cases). This is because the enterprise applications often come with strict security and performance requirements that necessitate complicated network topologies including switches, routers and middleboxes providing the workloads with application-level services. Therefore, moving the enterprise workloads onto a virtualized data center requires not only server virtualization but also the virtualization of the networks and the services.

In a software-defined data center, it is the virtualization software (e.g., the hypervisors) that implement and provide the workloads with logical networks with all the services in some embodiments. In these embodiments, the physical network becomes a provider of the IP transport between the hypervisors. This means that the network functionality visible to the workloads is provided by the standard x86 servers at the network edge realizing the logical networks and not by the network appliances scattered throughout the physical network. The shift in placement of functionality from the physical network to the logical networks creates a tremendous pressure on the hypervisor and its networking components in terms of keeping up the performance level because the hypervisor and its virtual switch software are compared against the features and capabilities traditionally provided by hardware components in the physical network.

BRIEF SUMMARY

Some embodiments provide a network control system that provides managed forwarding elements with flow entries defining certain high-level actions which reference various modules (e.g., C or C++ code, etc.) that execute on the same machine as the managed forwarding element. When a packet matches such a flow, the managed forwarding element offloads the lower-level processing of the high-level action to the module referenced by the matched flow entry. The module performs this lower-level processing and returns a set of actions for the managed forwarding element to perform on the packet, thereby reducing the number of processing-intensive lookup stages performed by the managed forwarding element.

For instance, in some embodiments, once a packet has been logically forwarded to a particular logical port (of a logical switch), four separate processing-intensive lookup stages are required to encapsulate the packet in a tunnel for sending to the logical port. However, such an operation can be executed easily in code as a set of "if . . . else" statements, which require minimal processing resources. Thus, some embodiments compress the four lookup stages into a single stage that calls a tunnel encapsulation function in separate code outside the managed forwarding element (but executing on the same host as the managed forwarding element). The tunnel encapsulation function quickly identifies the set of actions for the managed forwarding element to perform, and returns these actions to the managed forwarding element. The managed forwarding element can subsequently encapsulate the packet and send the packet out towards its destination.

Tunnel encapsulation is only one example of a set of multiple lookup stages which some embodiments offload to separate modules. Other embodiments may offload ingress context matching operations, ingress and/or egress ACL operations, logical forwarding operations, etc.

Some embodiments use other techniques to reduce the number of lookup stages performed by a managed forwarding element to process a packet. In some embodiments, the network control system of some embodiments combines multiple lookup stages into a single lookup stage via more complex flow entries. If a first stage is effectively a selection between N flow entries and a second stage is effectively a selection between M flow entries, then these two stages can, in some cases, be combined into a single lookup stage with M×N flow entries. Thus, such a technique may be useful for some cases, in which the memory tradeoff of having (M×N) flow entries compared to (M+N) flow entries is worth the reduction in processing time by eliminating a stage.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 1 is an example of a simple layer 2 (L2) pipeline that includes three lookup tables.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that provides managed forwarding elements with flow entries defining certain high-level actions which reference various modules (e.g., C or C++ code, etc.) that execute on the same machine as the managed forwarding element. When a packet matches such a flow, the managed forwarding element offloads the lower-level processing of the high-level action to the module referenced by the matched flow entry. The module performs this lower-level processing and returns a set of actions for the managed forwarding element to perform on the packet, thereby reducing the number of processing-intensive lookup stages performed by the managed forwarding element.

For instance, in some embodiments, once a packet has been logically forwarded to a particular logical port (of a logical switch), four separate processing-intensive lookup stages are required to encapsulate the packet in a tunnel for sending to the logical port. However, such an operation can be executed easily in code as a set of "if . . . else" statements, which require minimal processing resources. Thus, some embodiments compress the four lookup stages into a single stage that calls a tunnel encapsulation function in separate code outside the managed forwarding element (but executing on the same host as the managed forwarding element). The tunnel encapsulation function quickly identifies the set of actions for the managed forwarding element to perform, and returns these actions to the managed forwarding element. The managed forwarding element can subsequently encapsulate the packet and send the packet out towards its destination.

Figure 2:
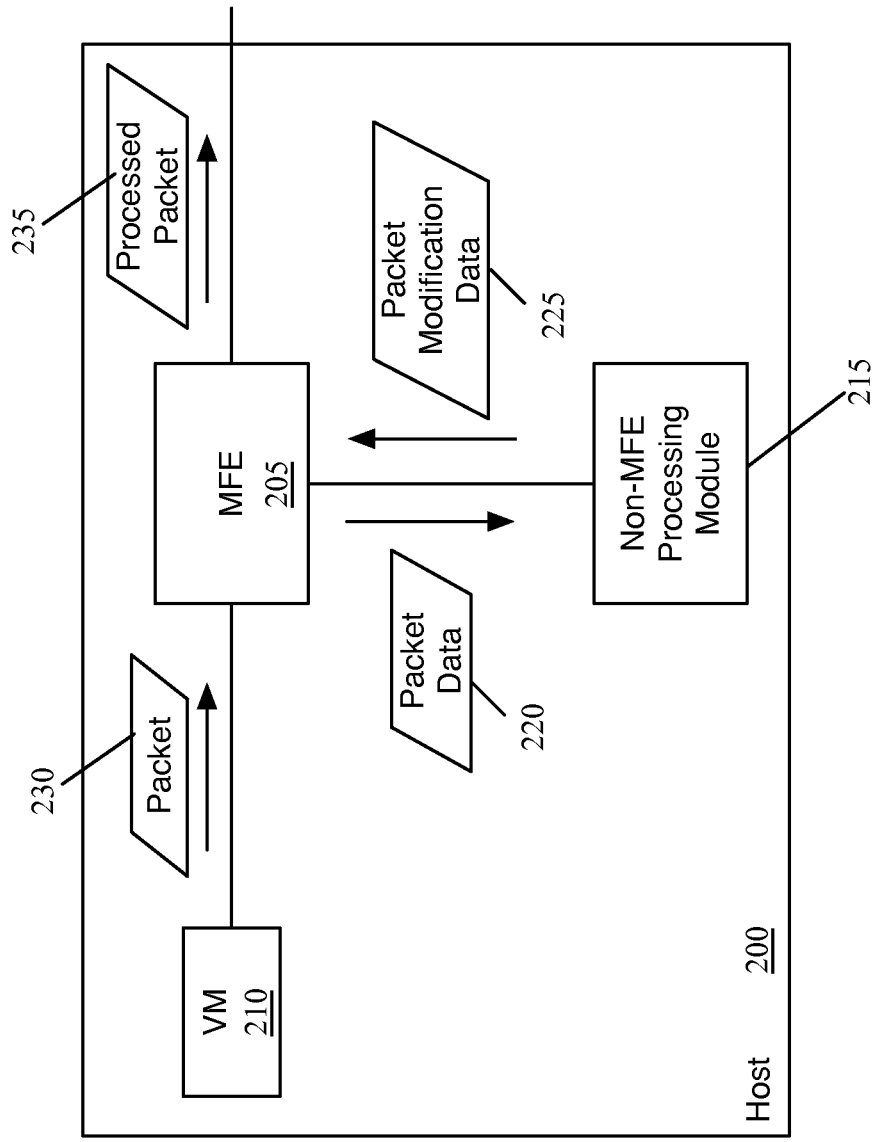
FIG. 2 conceptually illustrates a host machine with a managed forwarding element that performs packet processing offloading.

FIG. 2 conceptually illustrates a host machine 200 with a managed forwarding element 205 that performs such packet processing offloading. Specifically, the host machine 200 includes a virtual machine (VM) 210, the managed forwarding element (MFE) 205, and a non-MFE processing module 215. In some embodiments, described below, the host machine also includes a chassis controller that acts as part of the network control system to generate and/or customize flows for the MFE 205.

In some embodiments, the host machine 200 is one of many host machines operating in a datacenter (e.g., a public datacenter or an enterprise datacenter). These host machines host virtual machines (e.g., VM 210) for various different tenants, such that a particular tenant's VMs may be distributed throughout numerous different hosts. The tenant defines a logical network (e.g., a set of logical switches, logical routers, and other logical network components) with their VMs as the endpoints of this network (i.e., the sources and destinations of traffic packets).

The MFE 205, in some embodiments, is a software forwarding element that operates in the virtualization software of the host machine 200, such as Open vSwitch (OVS). The MFE 205 matches incoming packets (e.g., the packet 230) received from the VM 210 (or other VMs operating on the host 200) or sent to the VM 210 (or other VMs operating on the host 200) to flow entries based on properties of the packet, and perform actions specified by the matched flow entries. These flow entries may implement the logical processing pipelines for one or more logical forwarding elements of one or more logical networks. For example, the logical forwarding elements of the logical network to which the VM 210 connects will be implemented by the MFE 205.

In addition, if other VMs on the host 200 connect to additional logical networks, then the MFE 205 will implement these logical forwarding elements as well. In some embodiments, one of the conditions over which the MFE 205 matches flow entries is the logical network or logical forwarding element to which the packet belongs, data which the MFE 205 may store in a register.

Figure 3:
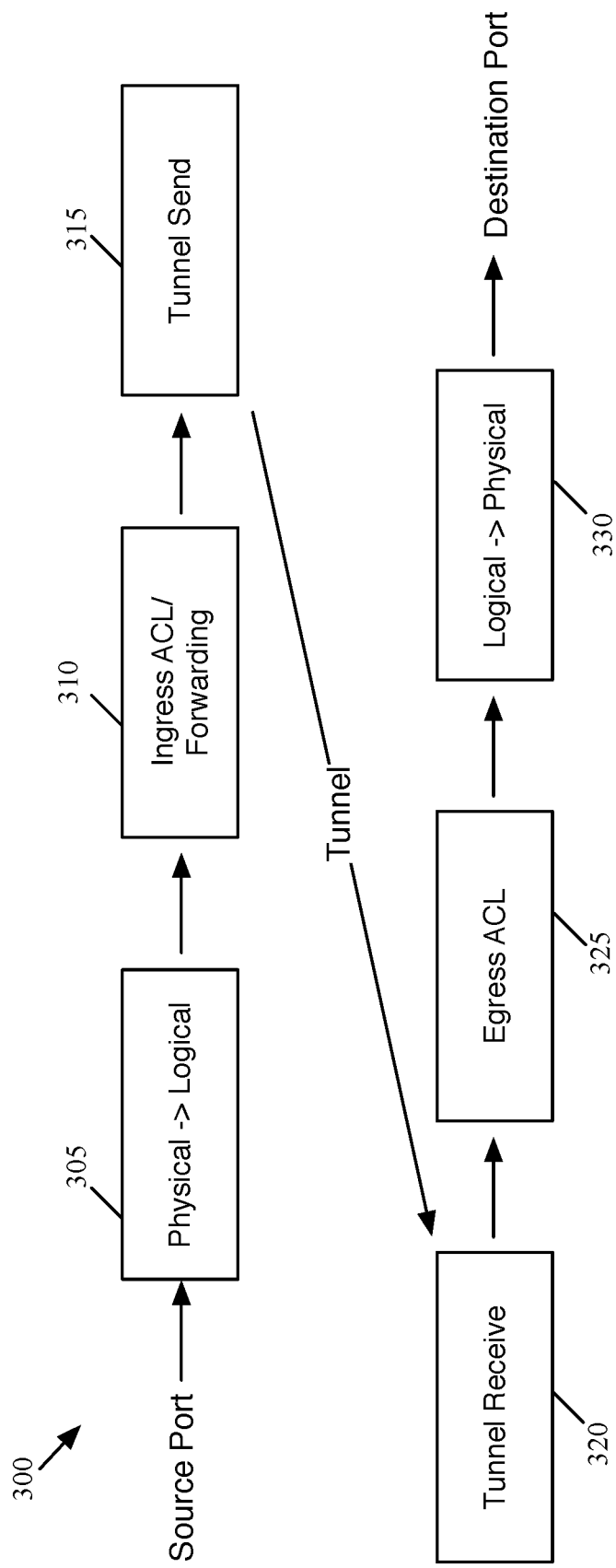
FIG. 3 conceptually illustrates a packet processing pipeline for a unicast L2 packet (i.e., an Ethernet frame) sent through a single logical switch.

In some embodiments, the MFE 205 performs a logical processing pipeline on each packet via a series of lookups over the flow entries. FIG. 3 conceptually illustrates a packet processing pipeline 300 for a unicast L2 packet (i.e., an Ethernet frame) sent through a single logical switch. In some embodiments, the first three high-level operations 305-315 are performed by the MFE that connects to the source of a packet (e.g., a VM sending a packet), whereas the latter three operations 320-330 are performed by the MFE that receives a packet. In some embodiments, these first three high-level operations (mapping from a physical source port to a logical ingress port, performing ingress ACL and logical L2 forwarding, and encapsulating the packet in a tunnel) require thirteen lookup stages. More example processing pipelines are described in U.S. patent application Ser. No. 13/589,062, filed Aug. 17, 2012, now published as US2013/0044636. US2013/0044636 is incorporated herein by reference.

This section refers to several packets of different types. The term "packet" is used here as well as throughout this disclosure to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

However, to reduce the number of such lookup stages (which may be processing-intensive), the MFE 205 offloads some of the packet processing to the non-MFE processing module 215. In some embodiments, the host (e.g., the virtualization software in the host) uses multiple such modules for different processing pipeline operations). Thus, one of the sets of lookup stages (e.g., the four stages required to encapsulate a packet in a tunnel) can be performed by one lookup. The single lookup identifies a flow entry which specifies an action to send certain packet data 220 to the non-MFE processing module 215. The non-MFE processing module 215 is compiled code (e.g., C, C++, etc. code) which implements the set of operations. For example, the tunnel operation can be executed easily in code as a set of "if . . . else" statements, which require minimal processing resources. Thus, some embodiments compress the four lookup stages into a single stage that calls a tunnel encapsulation function in separate code outside the managed forwarding element (but executing on the same host as the managed forwarding element). The non-MFE processing module 215 returns a set of packet modification data 225 to the MFE 205. In some embodiments, the packet modification data 225 is a set of actions for the MFE 205 to perform on the packet. For instance, when the non-MFE processing module 215 is a tunnel encapsulation function, this module returns a set of actions enabling the MFE to encapsulate the packet 230 and send the modified (e.g., encapsulate) packet 235 out towards its destination.

Using the separate processing modules (e.g., module 215) enables the MFE to perform fewer processing-intensive lookup stages, which are replaced by the modular operations. Some embodiments use other techniques to reduce the number of lookup stages performed by a managed forwarding element to process a packet. In some embodmients, the network control system of some embodiments combines multiple lookup stages into a single lookup stage via more complex flow entries. If a first stage is effectively a selection between N flow entries and a second stage is effectively a selection between M flow entries, then these two stages can, in some cases, be combined into a single lookup stage with M×N flow entries. Thus, such a technique may be useful for some cases, in which the memory tradeoff of having (M×N) flow entries compared to (M+N) flow entries is worth the reduction in processing time by eliminating a stage.

The above description introduces the use of high-level actions in flow entries to offload packet processing to modules outside the MFE. Several more detailed embodiments are described below. First, Section I introduces the network virtualization environment in which the invention of some embodiments is used, including introducing the managed forwarding elements (MFEs) and network control system. Section II then describes different types of MFEs and tradeoffs in their design. Next, Section III quickly describes a chassis controller used to parallelize the generation of flow entries in some embodiments. Section IV describes the use of single-stage lookups specifying high-level actions that refer to modules outside the MFE, while Section V describes the combination of lookup stages by cross-producting flow entries. Finally, Section VI describes an electronic system with which some embodiments of the invention are implemented.

I. Network Virtualization Environment

Before describing the hybrid packet processing in greater detail, the environment in which the invention of some embodiments takes place will be described. Specifically, some embodiments are implemented in a virtualized network environment. Network virtualization enables users to create logical network topologies by interconnecting logical switches and logical routers, as if they were physical network devices. In some embodiments, software forwarding elements running on hypervisors implement logical switches and logical routers, which behave similarly to their physical counterparts do in some embodiments. More details about logical switches and logical routers are described in U.S. patent application Ser. No. 13/177,535, filed Jul. 6, 2011, now published as US2013/0058250; as well as U.S. patent application Ser. No. 14/166,447, filed Jan. 28, 2014, now issued as U.S. Pat. No. 9,577,845. US2013/0058250 and application Ser. No. 14/166,447, now published as U.S. Pat. No. 9,577,845, are incorporated herein by reference.

The managed forwarding elements (e.g., software forwarding elements) of some embodiments are executed by CPUs, rather than switch ASICs used by physical switches. While CPUs are becoming increasingly better at handling these forwarding operations, a significant gap in processing speed remains between hardware and software forwarding elements, especially when a device running a software forwarding element replaces a standalone hardware forwarding element. Handling packets at a high rate still remains a challenge for software forwarding elements and calls for careful optimizations to the packet processing code path. The lack of ternary content addressable memories (TCAMs) on generic server hardware renders the instruction lookup expensive for the software forwarding elements to implement.

In some embodiments, software implementations exploit properties of forwarded network traffic to minimize the number of complicated lookups required. For instance, some embodiments use a flow cache to store lookup results so that the complicated lookups are executed only once for a given flow or data flow (e.g., a stream of packets having the same source and destination transmitted over a transport layer (e.g., TCP, UDP, etc.) connection). The majority of the forwarding decisions for subsequent packets are turned into exact match lookups (over the whole packet header), which need less processing resources for the software to perform.

In software-defined data centers, achieving an ideal software forwarding performance may not be as important because the hypervisors provide a natural scale-out software data plane and a deployment of additional hypervisors proportionally increases the CPU resources available for forwarding traffic generated by virtual machines (VMs). It is arguable that there is no need for software forwarding elements to reach the same packet forwarding performance as hardware forwarding elements. However, in some cases, the logical networks need to interface with the legacy physical networks to provide the physical networks with access to the services that the VMs run or to provide the VMs with access to the services running on non-virtualized servers connected to the physical networks. The limitations of the existing networking gear make it infeasible for the virtualization software implementing the software forwarding elements to interface directly with the networking gear (e.g., physical forwarding elements are typically not capable of handling the CPU load caused by all the edge MFEs (i.e., those directly connected to the VMs, typically operating on the same host machines as the VMs) peering with the physical forwarding elements). Thus, in some embodiments, dedicated aggregated integration points in the networks are used. In these embodiments, network virtualization solutions include gateway appliances that interconnect the software-defined datacenter network to the external physical network.

Similar to the edge MFEs, the gateway devices of some embodiments also run software forwarding elements. The gateway devices not only need to operate at high packet rates (since a gateway serves many logical networks) but also need to provide high fan-out connectivity (as a gateway may serve a large number of directly attached physical servers). These two requirements contradict the capabilities of software appliances built on standard server hardware, which means that hardware aspects should be considered in software-only forwarding-based network.

The MFEs of some embodiments (also referred to as virtual switches, virtual forwarding elements, etc.) can be categorized into two types with respect to how they realize the forwarding operations needed for network virtualization. Programmable MFEs (e.g., Open vSwitch) depend on detailed instructions from an external management system to provide the forwarding services. Non-programmable switches, on the other hand, have all features hardcoded, and need less external support for their operations (e.g., VMware's ESX vSwitch). The involved trade-offs of these switch types are described below, as well as a design of some embodiments combining aspects of both.

Two widely deployed virtual switches include ESX vSwitch (e.g., for vSphere by VMware) and Open vSwitch (e.g., for Xen and Kernel-based Virtual Machine (KVM)) as described in the following paper: B. Pfaff, J. Pettit, T. Koponen, K. Amidon, M. Casado, and S. Shenker. Extending Networking into the Virtualization Layer. In Proc. of HotNets, 2009, which is incorporated herein by reference. While the former is closed source and the latter is open source, their fundamental differences are not in the runtime environments or licensing but in their approaches to realizing packet-forwarding operations. An ESX vSwitch (referred to as ESX) more closely resembles forwarding implemented in hardware switches. That is, the ESX packet processing features are hardwired to their arrangement and the ESX configuration options are only for adjusting, disabling, or enabling individual features. On the other hand, an Open vSwitch (OVS) provides a flow instruction set based on OpenFlow and thereby allows a controller to program the switch with OpenFlow instructions to realize various features. OpenFlow allows for adding new network features by upgrading the controller to generate new instructions with little or no change to virtual switch implementation. The OpenFlow protocol is described in the following paper: N. McKeown, T. Anderson, H. Balakrishnan, G. Parulkar, L. Peterson, J. Rexford, S. Shenker, and J. Turner. OpenFlow: Enabling Innovation in Campus Networks. SIGCOMM CCR, 38(2): 69-74, 2008, which is incorporated herein by reference.

Many custom hardware switches have a better cost-performance ratio than that of the software switches. However, it is equally difficult for the hardware development process to match the software development process in agility, thereby making software forwarding elements more ideal for the virtualized network environment. Thus, the question for the software switch design is how to maximize development flexibility without sacrificing throughput. To this end, the design decisions and trade-offs driving the flexibility and performance of the virtual switches are crucial.

As mentioned, some embodiments of the invention are implemented at least in part by a network control system that is formed by one or more controllers (controller instances) for managing several managed forwarding elements. In some embodiments, each controller instance runs on a device (e.g., a general-purpose computer) that executes one or more modules that transform data describing one or more logical forwarding elements (e.g., logical switches, logical routers, etc.) from logical control plane data to logical forwarding plane data, and then transform the logical forwarding plane data to physical control plane data. These modules, in some embodiments, include a control module and a virtualization module. The control module allows a user to specify and populate a logical datapath set, while the virtualization module implements the specified logical datapath set by mapping the logical datapath set onto the physical switching infrastructure.

In some of the embodiments, the control module of a controller receives logical control plane data (e.g., data that describes the connections associated with a logical forwarding element) that describes a logical datapath set from a user (e.g., a network administrator) or another source. The control module then converts this data to logical forwarding plane data that is then supplied to the virtualization module. The virtualization module then generates the physical control plane data from the logical forwarding plane data. The physical control plane data is propagated to the managed forwarding elements. In some embodiments, the control and virtualization modules use a table mapping engine (e.g., an nLog engine) to generate logical forwarding plane data from logical control plane data and physical control plane data from the logical forwarding plane data. The nLog engine of some embodiments is described in U.S. patent application Ser. No. 13/177,533, entitled "Network Virtualization Apparatus and Method," filed Jul. 6, 2011, now published as US2013/0058228. US2013/0058228 is incorporated by reference in this application.

Some embodiments use a hierarchical network control system with different controllers for performing different tasks. Some embodiments include an application protocol interface (API) controller responsible for receiving configuration data and user queries from a user through API calls and responding to the user queries. The API controllers also disseminate the received configuration data to the other controllers. These controllers serve as the interface between users and the network control system. A second type of controller in some embodiments is a logical controller, which is responsible for implementing logical datapath sets by computing universal flow entries that are generic expressions of flow entries for the managed forwarding element that realize the logical datapath sets. A logical controller in some embodiments does not interact directly with the physical forwarding elements, but pushes the universal flow entries to a third type of controller, a physical controller. The universal flow entries are described in U.S. patent application Ser. No. 13/589,077 entitled "Chassis Controller," filed Aug. 17, 2012, now published as US2013/0103817. US2013/0103817 is incorporated by reference in this application.

Physical controllers in different embodiments have different responsibilities. In some embodiments, the physical controllers generate customized flow entries from the universal flow entries and push these customized flow entries down to the managed forwarding elements. In other embodiments, the physical controller identifies for a particular managed, physical forwarding element a fourth type of controller, a chassis controller, that is responsible for generating the customized flow entries for a particular forwarding element, and forwards the universal flow entries it receives from the logical controller to the chassis controller. The chassis controller then generates the customized flow entries from the universal flow entries and pushes these customized flow entries to the managed forwarding elements. In yet other embodiments, physical controllers generate customized flow entries for some managed forwarding elements, while directing chassis controllers to generate such flow entries for other managed forwarding elements.

Depending on the size of the deployment managed by a controller cluster, any number of the different types of controller may exist within the cluster. In some embodiments, a leader controller has the responsibility of partitioning the load over all the controllers and effectively assigning a list of logical datapath sets for each logical controller to manage and a list of physical forwarding elements for each physical controller to manage. In some embodiments, the API responsibilities are executed at each controller in the cluster. However, similar to the logical and physical responsibilities, some embodiments only run the API responsibilities on a subset of controllers. This subset, in some such embodiments, only performs API processing, which results in better isolation between the API operations and the rest of the system. In addition, some embodiments do not use such a hierarchical system, but rather have a single controller (or cluster of controllers) generating the physical control plane data.

In some embodiments, the customized physical control plane data are instructions describing flow entries (e.g., OpenFlow instructions). From the received physical control plane data, the MFE can generate and install flow entries to use when processing packets sent to and from the VMs to which it is connected.

II. Managed Forwarding Element Trade-Offs

As mentioned, some embodiments attempt to improve the throughput of a software forwarding element, which is generally a function of how quickly the CPU of the machine on which the software forwarding element runs can perform the specified packet processing operations. This section briefly describes high-level design differences in two types of software forwarding element implementations, and the trade-offs involved in designing the instruction set provided to the controllers.

A. Basics of Two Types of MFEs

Some MFEs provide a typical hardwired forwarding plane in their native support for a wide range of features, from L2 forwarding and security to monitoring and quality of service (QoS). Such MFEs, in some embodiments, implement each of the features themselves. As such, adding new features requires changing the code of the MFE itself. Such MFEs are more autonomous in their operations and generally do not need low-level instructions from a controller (e.g., VMware™'s vCenter), other than the configuration parameters. Hence, the instruction set exposed by such MFEs is limited in expressibility and is abstract (or high-level), e.g., instructions for enabling or disabling a feature and changing the settings of a feature.

On the other hand, other MFEs (e.g., Open vSwitch) build on a well-defined, low-level instruction set (e.g., OpenFlow, or VMware Internetworking Service Insertion Platform (vSIP) for implementing stateful firewall service and integration with other middlebox services). An instruction, called a flow or a flow entry, includes a set of matching conditions and a series of actions to execute for matching packets in some embodiments. A condition specifies the expected value of a protocol header field (e.g., the source media access control (MAC) address of an Ethernet frame) or the expected value of some metadata (called registers) associated with a packet. An action describes an operation for the MFE to perform, such as setting the source MAC address of an Ethernet frame, loading a particular value into a register, or outputting the packet to a port. For instance, the following flow means that "if this packet is an ARP reply to 20.0.0.1 (an IP address) and register 0 is 0, load 1 into register 0 and output (send) to port 1":

reg0=0, nw_dst=20.0.0.1, arp_op=2 actions=load:1->NXM_NX_REG0[],output:1

The MFE stores flow entries in tables and matches incoming packets against the entries in the table. Packet processing is not limited to a single lookup, however, as the flow instructions can move packet through a series of flow tables (i.e., multiple lookup stages). At each stage, the MFE matches the packet (its protocol header and register values) against the current table. If more than one flow matches, the higher priority flow entry is selected. A controller generates the necessary flow entries in order to implement high-level networking features. Examples of such controllers are described in the above-incorporated U.S. Patent Publication US2013/0103817. Also, more information on the format of flows in the OpenFlow protocol are described in the following document: ovs-ofctl—administer OpenFlow switches (http://openvswitch.org/cgi-bin/ovsman.cgi?page=utilities%2Fovs-ofctl.8). This document is incorporated herein by reference.

Whereas some network controllers have requested that the MFEs send to the controller packets that do not match currently installed flow entries, this approach poses response time and scalability challenges. As such, the network control system of some embodiments, as described in the previous section, uses a different approach. Such a network control system proactively computes all the flow entries based on the current user input and the current network state and installs the flow entries to the MFEs. Upon user input or network state changes, the controller modifies the flows entries impacted by these changes and sends the delta to the affected MFEs.

B. Placement of Complexity

The complexity of a MFE increases as the instruction set it exposes becomes more abstract, because the forwarding element becomes more feature-aware. In the case of the hardwired MFEs, most of the complexity is absorbed by the MFE itself because it realizes all the features. The complexity of more abstract MFEs (e.g., OVS), on the other hand, is well contained, since it only operates on instructions from the controller and does not need to understand all the high-level networking features provided by the controller.

The interface between the controller (or controller cluster) and MFEs equally impacts the complexity of the controller. A lower-level interface not only demands the controller to generate the right set of flow entries to implement the features but it also sends a larger volume of data to the MFEs to enable a particular feature. Hence, the lower the level of the interface, the more state (e.g., data representing network state) a controller has to maintain and disseminate. For instance, a controller in some cases produces around 3,000,000 flow entries for 7,000 logical switches with 63,000 logical switch ports and various features on 3,000 host machines (i.e., 3000 MFEs). In addition to incurring CPU and memory overhead, the huge number of flow entries to produce and maintain complicates the controller design.

C. Convergence Properties

Changes in forwarding behavior that require reacting at packet time scales will typically not involve controllers. For instance, forwarding elements implement all failover logic locally in some embodiments. For other changes in forwarding behavior, it is still generally preferable for the system to promptly react to any configuration changes. When the interface between controller and forwarding elements is not at the feature-level, the changes are provided to a computation engine (e.g., the nLog engine described above), which "compiles" the input to the instructions supported by the MFEs. The lower the level of the instruction set, the more resources this transformation (from the input to the instructions) requires. In order to provide a better response time to the user's input, a controller with the capability to perform incremental computation (i.e., recomputing only the set of instructions affected by the changes rather than all instructions) is preferable.

Similarly, when a master controller in a cluster fails, another controller in the cluster takes over the failed controller's responsibility immediately in order to maintain the network control system's ability to react to any configuration changes in some embodiments. Because the new master controller accepts user requests and delivers similar responsiveness, the new master should have all the instructions computed already in order to continue from where the previous master stopped. Thus, the controller cluster computes the flow entries for any particular MFE at several controllers in the cluster for guaranteed redundancy in some embodiments.

The level of abstraction of the interface has an impact on the cold start times. When an entire controller cluster is restarted (either for an upgrade or to recover from a crash), the cluster has to compute the global, current state of the system (e.g., the instructions for all MFEs). This means user input cannot be processed until the system has converged (i.e., until the computed state propagates to all components of the system). To mitigate this problem, a controller of some embodiments periodically takes a snapshot of the computation result and thereby avoids re-computing the whole state. However, doing so adds additional complexity to the network control system.

D. Forwarding Throughput

As mentioned above, the packet processing performed by a MFE requires multiple stages, each of which matches a flow entry and causes the MFE to perform one or more actions on a packet. At each stage, the MFE performs a lookup to find the next matching flow entry in order to guide its packet processing. For many MFEs, performing a looking up for the next instruction is not as easy as performing an operation in a CPU pipeline such as incrementing a counter or loading a branch target into a program counter (PC). In some embodiments, performing a lookup for the next matching flow entry involves packet classification. That is, the MFE has to find the highest priority flow entry in a given table that matches the packet header. Implementing packet classification, in software, without TCAMs, involves complex data structures and a series of hash table lookups.

A lower-level instruction performs less work at one operation and therefore more pipeline stages are required in order to complete the packet processing. As a result, the MFE performs more lookups for a packet, which causes less throughput and higher latency. In addition, this problem increases as the MFEs implement logical network topologies and the number of required lookups increase as the size of the logical topology grows, with each logical forwarding element in the logical topology having its own logical pipeline in some embodiments. If a packet needs to traverse more than one logical hop in a logical network, the MFE will perform the logical pipeline of each logical forwarding element that the packet traverses. While the MFE can use a flow cache to speed up processing for subsequent packets in a flow or data flow (e.g., data transmitted over a transport-layer connection), the MFE still performs the full stage-by-stage lookup process for the first packet in a flow in some embodiments. Such overhead can be significant, especially in the presence of many short-duration data flows.

As indicated above, FIG. 3 conceptually illustrates a packet processing pipeline for a single logical switch, which could be one of several logical forwarding elements that a packet traverse. Just at the first MFE, this packet processing pipeline requires 13 lookup stages. There are several reasons for having so many stages.

One such reason is memory concerns (i.e., keeping the number of flow entries to a reasonable level). For a single policy that matches against two packet header fields A and B, which each have m_A and m_B choices respectively, implementing the policy using a single lookup stage requires m_A*m_B flow entries. On the other hand, implementing the policy using a two-stage lookup requires m_A+m_B flow entries, which will be smaller than m_A*m_B unless there is only choice for the value of either A or B. A second reason is modularity. For such reasons, controller developers may prefer to divide the packet processing into separate stages in some embodiments. The flow entries for each operation are produced by different controller modules, resulting in more than one stage. A third such reason is limited expressivity. That is, the the amount of operations performed by a single flow entry is limited in some cases (e.g., in OpenFlow). In some cases, an OpenFlow flow corresponds to a single if-statement.

For the reasons above, a single high-level operation is often split into several lookup stages in some embodiments, which each stage depending on its own conditions (which may be the result of the actions of a previous stage). For instance, to perform a "tunnel send" operation (i.e., to encapsulate a packet in a tunnel) requires the following four stages in some embodiments:

(1) Fabric prepare: Load the destination port's location into a first register.

(2) Output mesh: Based on the location in the first register, find out the right tunnel port and load it into a second register.

(3) Self tunnel: If the second register points to the MFE itself, perform a special handling process; otherwise, proceed to the tunnel output stage.

(4) Tunnel output: Based on the actual tunnel protocol, load the metadata into tunnel registers and output to the tunnel port specified by the second register.

E. External Constraints

The external constraints that the two virtual models' operating environments create are considered. Hardcoded MFEs (e.g., the ESX vSwitch) generally have few, if any, external constraints because they are developed in-house and run on a closed virtualization software platform. On the other hand, the Open vSwitch is designed to provide advanced switching functionality for Linux™, as well as to serve as a common control plane for hardware switching platforms, simplifying the management of hardware switches.

This highlights the rigidity from which a programmable MFE such as Open vSwitch (and the programming protocols such as OpenFlow) shields itself. Such an MFE builds on small flow primitives because changing and evolving these primitives, once established, is complicated and time consuming. In case of Linux, introducing new primitives might require changes to upstream kernel (which is laborious and unpredictable process) whereas, in case of hardware forwarding ASICs, new primitives would require changes to the silicon (which is extremely time consuming). Moreover, the ASICs are different in the details of their forwarding semantics. That is, the more abstract the primitive is defined over all ASICs, the more difficult it is to provide unified semantics across switches, without having slight differences in behavior depending on the version and vendor of the chip.

Managing switches at the feature-level results in a simpler controller, but evolving the switch feature set becomes complicated. On the other hand, managing switches at the machine instruction-level (e.g., OpenFlow level) maximizes evolvability, at the cost of significant complexity and overhead at the controller.

III. Chassis Controller for Flow Generation

Various non-mutually-exclusive techniques can be used to provide improvements to MFEs. Some embodiments, for example, combine aspects of the hardcoded virtualization software with the more flexible programmable MFEs.

In some embodiments, rather than having only a centralized controller cluster managing all of the MFEs in a datacenter, some embodiments use a chassis controller running alongside each MFE on the host on which the MFE operates. In some embodiments, the interface between the central controller and the chassis controller is abstract and remains at a feature level. That is, rather than the central cluster producing the final instructions for the MFE, the chassis controller transforms the high-level instructions received from the cluster to the low-level instructions. Chassis controllers are further described in the above-incorporated U.S. Patent Publication US2013/0103817.

Using a higher-level interface between the central controller and the chassis controller reduces the amount of the state that central controller has to manage and has the potential to simplify the central controller design. This improves the cold start time and the response time to the user request or input. It also harnesses more CPU resources for computing the low-level instructions as the computation can happen in parallel, at all hypervisors and gateways, and not just in the central cluster. This reduction in the central cluster does come with an additional cost in some embodiments—the overall amount of the required work increases as chassis controllers at each MFE and gateway are asked to repeat some of the computations.

IV. Offloading Operations to Separate Modules

Although the state managed by the central controller cluster is less when using the chassis controllers at each of the host machines, the overall state managed by the system remains the same. Reducing the number of lookup stages and flow entries is also important in order to reduce both the state managed by the network control system and the associated CPU and memory overhead at the MFEs for each forwarded packet. For gateway appliances, saving resources may be especially important in some embodiments, as several logical networks (and several MFEs per logical network) share use of the gateway for packet sent into and out of the managed network.

As such, some embodiments introduce more abstract and higher-level actions in order to significantly reduce the number of flow entries generated by the network control system (e.g., the centralized controller cluster, the chassis controllers, etc.) as well as the number of lookup stages performed by a MFE when processing a packet.

In some embodiments, a high-level action performs a series of operations related to a single packet-processing stage, such as logical L2 forwarding, L3 ingress ACL, tunnel encapsulation/sending, etc. Some embodiments use these high-level actions to comprises multiple stages into a single lookup stage at the MFE, which specifies as the high-level action a module which performs the separate lower-level actions. For instance, a single high-level "output-to-logical-port" action performs all four lower-level actions required for the "tunnel encapsulation/send" operation.

In some embodiments, these network virtualization-specific actions are registered as binary modules to the MFE in runtime. When the MFE is to execute an action registered by a module or a plugin, the MFE dispatches the packet to the module as shown in FIG. 2 above (e.g., by sending packet data as parameters of a function call). In some embodiments, the module performs the low-level decisions and operations in order to determine the output actions for the packet. In some embodiments, the low-level operations may involve looking up an internal data structure (e.g., a register value) or sending queries to an external entity to receive information (e.g., the current location of a logical port). An example of a precursor design to some embodiments is described in the following paper: M. Casado, T. Koponen, D. Moon, and S. Shenker: "Rethinking Packet Forwarding Hardware", In Proc. of HotNets, October 2008, which is incorporated by reference.

Once the module determines the low-level packet operations, the module sends the packet back to the MFE together with the operations the packet requires in some embodiments. The MFE then executes these actions and any further lookup stages, possibly including calling additional modules based on other high-level flow entries. In some embodiments, the MFE caches the packet operations in a flow cache, so that packets in the same transport connection can be forwarded faster (by performing an exact match over the flow cache and performing the same operations determined for the first packet in the connection). Using the flow cache means that both the lookup stages and the modular processing can be avoided.

Figure 4:
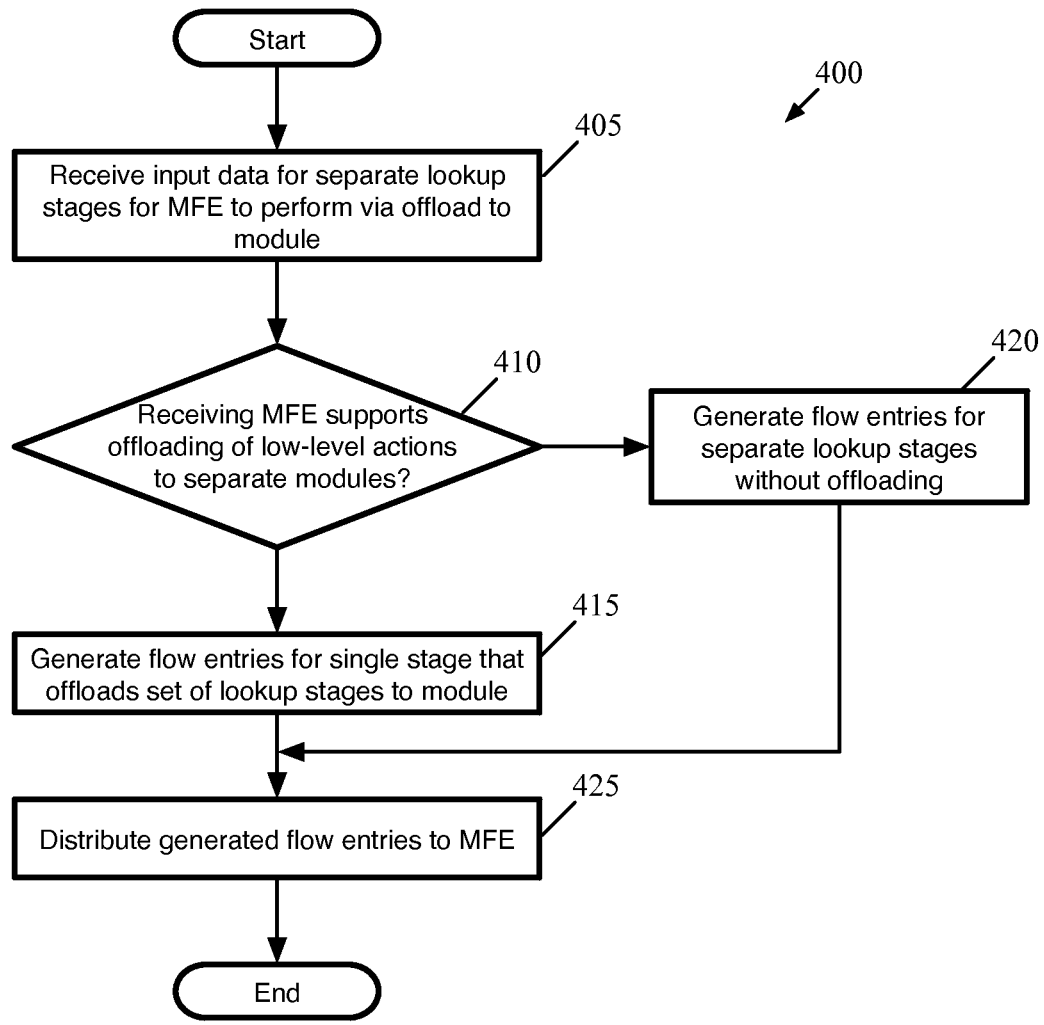
FIG. 4 conceptually illustrates a process of some embodiments for generating and distributing flow entries that specify such high-level actions to one or more MFEs.

FIG. 4 conceptually illustrates a process 400 of some embodiments for generating and distributing flow entries that specify such high-level actions to one or more MFEs. The process 400 may be performed by a chassis controller generating flow entries for a single MFE, or by a centralized controller (e.g., a logical controller in a hierarchical network control system) that generates flow entries for numerous MFEs. In such a case, while this process is shown for generating the flow entries for a single MFE, the centrailzed controller will perform the decision 410 for each MFE in some embodiments.

As shown, the process 400 begins by receiving input data for several separate lookup stages for the MFE to perform via offloading to a non-MFE module. The input data, in some embodiments, may be logical control plane data describing a network topology, logical forwarding plane data for converting to physical control plane data, etc. The separate lookup stages in this case are the stages that correspond to some high-level action, such as logical forwarding, ingress or egress ACL, ingress context matching, tunnel encapsulation, etc.

The process then determines (at 410) whether the MFE that will receive these flow entries supports the offloading of low-level actions to separate modules. In some embodiments, different MFEs in a virrtualized datacenter may not have the same capabilities. The controller may determine via a query to the MFE whether the MFE has such capabilities, or this information may be provided as part of the input data.

When the receiving MFE supports the offloading of low-level actions to separate modules, the process 400 generates (at 415) the flow entries for a single stage that offloads the set of separate lookup stages to a module. In some embodiments, only one flow entry may be needed, which effectively is a match over (1) a logical processing pipeline (i.e., corresponding to a logical forwarding element) and (2) a specific high-level stage within that pipeline (e.g., the tunnel sending stage). In some embodiments, this requires a match over one or more registers. The action for such a flow entry will be to simply send the packet to the module for processing.

On the other hand, when the receiving MFE does not support such offloading, the process 400 generates (at 420) the flow entries for the separate lookup stages without offloading. That is, the controller generates the flow entries in its usual manner. In some embodiments, the implementation of the decision at operation 410 is within the declaratory nLog code, which specifies a first set of database table mapping operations (e.g., "join" operations) to generate the flow entries for MFEs that support offloading and a second set of database table mapping operations to generate the flow entries for MFEs that do not support offloading. As such, the custom actions do not necessarily complicate hardware integration.

The process 400 then distributes (at 425) the generated flow entries to the MFE. In the case of the chassis controller, this distribution is performed within the host machine. In some embodiments, the controller also generates and/or distributes the modules to the host machine on which the MFE operates for installation on the host machine. In other embodiments, these modules are installed on the host (e.g., in the virtualization software, within a VM, etc.) as part of the deployment of the host.

Figure 5:
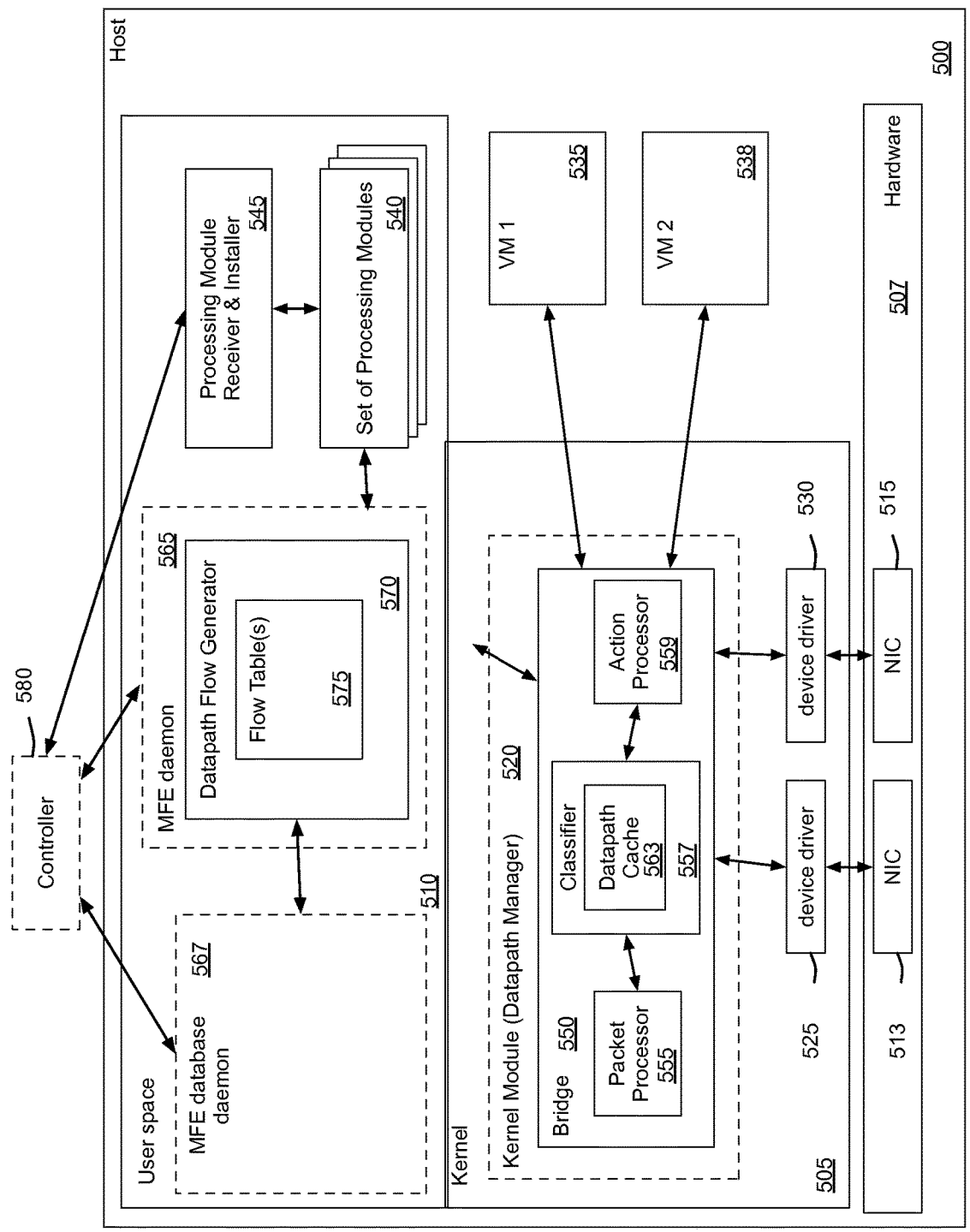
FIG. 5 conceptually illustrates an architectural diagram of a host machine on which a software-implemented MFE of some embodiments is implemented.

FIG. 5 conceptually illustrates an architectural diagram of a host machine 500 on which a software-implemented MFE of some embodiments is implemented. In some embodiments, the MFE is implemented in the virtualization software (e.g., in the hypervisor) for the host 500. In this example, the MFE includes several components, including a kernel module 520 (operating in the virtualization software kernel 505) as well as a MFE daemon 565 and MFE database daemon 567 (both of which operate in the user space 521 of the virtualization software).

As shown in FIG. 5, the host 500 includes hardware 507 (though this is a software architecture diagram, the hardware 507 is displayed in order to represent the NICs of the machine), virtualization software kernel 505, virtualization software user space 510, and two VMs 535 and 538. The hardware 507 may include typical computer hardware (e.g., processing units, volatile memory (e.g., RAM), nonvolatile memory (e.g., hard disk, optical disks, solid-state memory, etc.), network adapters, etc. As shown, the hardware 507 also includes network interface controllers (NICs) 513 and 515 for connecting a computing device to a network.

The virtualization software that includes the kernel 505 and user space 510 is a software abstraction layer that operates on top of the hardware 507 and below any operating system in some embodiments. In some embodiments, the kernel 505 performs virtualization functionalities (e.g., to virtualize the hardware 507 for several virtual machines operating on the host machine). The kernel 505 handles various management tasks, such as memory management, processor scheduling, or any other operations for controlling the execution of the VMs 535 and 538 operating on the host machine.

As shown, the kernel 505 includes device drivers 525 and 530 for the NICs 513 and 515, respectively. The device drivers 525 and 530 allow an operating system to interact with the hardware of the host 500. The VMs 535 and 538 are independent virtual machines operating on the host 50, and may run any number of different operating systems (e.g., Linux, Solaris, FreeBSD, or any other type of UNIX based operating system, Windows-based operating systems, etc.).

As shown, the user space 510 of the virtualization software includes the MFE daemon 565 and the MFE database daemon 567, as well as a set of processing modules 540 and a processing modules receiver and installer 545. The MFE daemon 567 is an application that runs in the background of the user space 510. The MFE daemon 565 of some embodiments receives configuration data from the network controller 580 (which may be a chassis controller operating on the host, or a centralized controller) and the MFE database daemon 567. For instance, from the controller, the MFE daemon 565 receives the generated flow entries, which it stores in the flow table 575.

In some embodiments, the MFE daemon 565 communicates with the network controller 580 using the OpenFlow Protocol. In some embodiments, the MFE database daemon 567 communicates with the network controller 565 through a database communication protocol (e.g., OVSDB protocol). The database protocol of some embodiments is a JavaScript Object Notation (JSON) remote procedure call (RPC) based protocol.

The MFE database daemon 567 is also an application that runs in the background of the userspace 510 in some embodiments. The MFE database daemon 567 some embodiments communicates with the network controller 580 in order to configure aspects of the MFE (e.g., the MFE daemon 565 and/or the kernel module 520) other than the installation of flow entries. For instance, the MFE database daemon 567 receives management information from the network controller 580 for configuring bridges, ingress ports, egress ports, QoS configurations for ports, etc., and stores the information in a set of databases.

As illustrated in FIG. 5, the kernel 520 includes the kernel module 520. This module processes and routes network data (e.g., packets) between VMs running on the host 500 and network hosts external to the host (i.e., network data received through the NICs 513 and 515). For example, the kernel module 520 of some embodiments routes packets between VMs running on the host 500 and network hosts external to the host 500 couple to the kernel module through a bridge 550.

In some embodiments, the bridge 550 manages a set of rules (e.g., flow entries) that specify operations for processing and forwarding packets. The bridge 550 communicates with the MFE daemon 565 in order to process and forward packets that the bridge 550 receives. For instance, the bridge 550 receives commands, from the network controller 580 via the MFE daemon 565, related to processing and forwarding of packets.

In the example of FIG. 5, the bridge 550 includes a packet processor 555, a classifier 557, and an action processor 559. The packet processor 555 receives a packet and parses the packet to strip header values. The packet processor 555 can perform a number of different operations. For instance, in some embodiments, the packet processor 555 is a network stack that is associated with various network layers to differently process different types of data that it receives. Irrespective of all the different operations that it can perform, the packet processor 555 passes the header values to the classifier 557.

The classifier 557 accesses the datapath cache 563 (also referred to as a flow cache) to find matching flows for different packets. The datapath cache 563 contains any recently used flows. The flows may be fully specified, or may contain one or more match fields that are wildcarded. When the classifier 557 receives the header values, it attempts to find a flow or rule installed in the datapath cache 563. If it does not find one, then the control is shifted to the MFE Daemon 565 for full packet processing (i.e., executing of numerous lookup stages). One primary distinction between the fast path cache 563 and the set of flow tables 575 is that there is at most only one matching flow entry in the fast path cache 563 which specifies all of the actions to take in order to process the packet.

If the classifier 557 finds a matching flow, the action processor 559 receives the packet and performs a set of actions that are associated with the matching flow. The action processor 559 of some embodiments also receives, from the MFE daemon 565, a packet and a set of instructions to perform on the packet. For instance, when there is no matching flow in the datapath cache 563 for a packet, the packet is sent to the MFE daemon 565. The MFE daemon 565 may generate a flow and install that flow in the datapath cache 563. The MFE daemon 565 might also send the packet to the action processor 559 with the set of actions to perform on that packet.

The MFE daemon 565 of some embodiments includes a datapath flow generator. The datapath flow generator 570 is a component of the MFE that makes forwarding and other packet processing decisions. For any packet that is not matched in the datapath cache 563 (e.g., because the packet is the first in a transport-layer connection), the datapath flow generator 570 performs the one or more flow table lookups required to process the packet, and then generates a new flow to install in the cache 563. In some embodiments, the datapath flow generator includes or works in conjunction with a separate classifier (not shown) in order to find one or more matching flow entries in the flow table 575. Unlike the classifier 557, the MFE daemon 565 may perform one or more resubmits (i.e., be resubmitted back to the classifier with packet data modified based on actions performed by previous matched flow entries).

In some cases, a matched flow entry stored in the flow table 575 specifies as its action (or one of its set of actions) to perform an operation handled by one of the set of processing modules 540. In this case, the MFE daemon 565 passes the packet (or packet data) to the specified module (one of the modules 540) for processing. This module performs its processing (a substitute for multiple lookups into the flow table 575 and resubmits by the classifier of the MFE daemon 565) and returns a set of actions for the MFE to perform.

In some embodiments, the set of processing modules 540 operate in the user space 510 of the virtualization software on the host 500, as shown. In other embodiments, these processing modules may operate in a virtual machine such as the VMs 535 and 538 (though not a VM allocated to a specific tenant), or separate virtual machines for each packet processing module. In addition, as shown, some embodiments include a processing module receiver and installer module 545, though other embodiments do not include such a module. The receiver and installer module 545 of some embodiments receives these packet processing modules from the controller 580 (e.g., a chassis controller, centralized controller, etc.), and installs them on the host machine 500. In other embodiments, however, these modules are installed manually and do not come from the controller.

In addition, in some embodiments, these modules also monitor any external state on which their processing results depends (e.g., the location of a logical port for a tunnel encapsulation/sending module), and notify the MFE to invalidate any potential cached flow entries as necessary in some embodiments.

One of ordinary skill in the art would understand that the architecture shown in FIG. 5 is an example architecture and that different embodiments can include different sets of components. The naming of the various components is arbitrary and can change from one implementation to another. Also, the architecture shows two different layers (e.g., the kernel layer and the userspace layer) performing various operations. In some embodiments, these operations occur at just one layer (e.g., at the userspace layer) or are further split into other layers.

Figure 6:
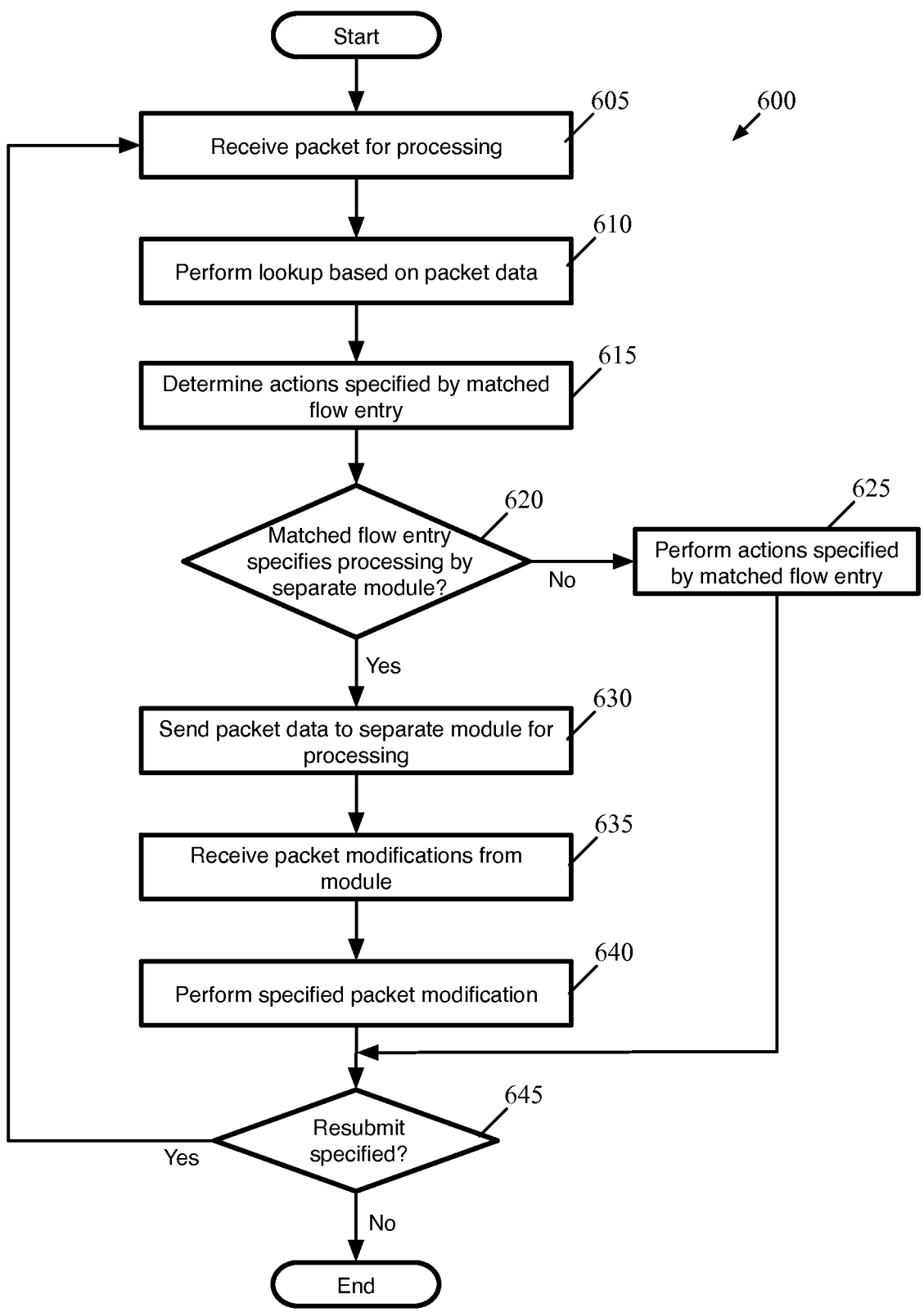
FIG. 6 conceptually illustrates a process of some embodiments for processing a packet by the MFE FIG. 7 conceptually illustrates the processing of a packet through a first forwarding table that includes flow entries for four stages of processing in order to encapsulate a packet in a tunnel and send the packet out to the physical network.

FIG. 6 conceptually illustrates a process 600 of some embodiments for processing a packet by the MFE. Specifically, the process 600 is performed by the user space aspect of a MFE in some embodiments, for packets that do not match a flow entry in the kernel space flow cache kept by the MFE. Thus, this process may only be performed once for each packet in a transport connection, after which the MFE installs a flow entry for the connection in the kernel space cache, which is used to quickly process subsequent packets.

As shown, the process 600 begins by receiving (at 605) a packet for processing. This operation 605 represents both (i) receiving a packet for the first time without having yet performed any operations on the packet as well as (ii) receiving a packet for which data is already stored by the MFE (e.g., in registers for the packet) after a previous matched flow entry specified to resubmit the packet. As part of receiving the packet, some embodiments store various packet data in registers (e.g., packet header information such as source and destination addresses or transport protocol, the port on which the packet was received, etc.) for use in performing lookups.

The process then performs (at 610) a lookup into the flow table(s) of the MFE based on the packet data. As mentioned, this packet data may be stored in registers. The packet data over which a lookup may be performed could include source and destination addresses (e.g., MAC addresses, IP addresses, etc.), register values indicating logical context (e.g., logical forwarding element through which the packet is being processed, current operation in the pipeline of the logical forwarding element, etc.), ingress or egress ports (both logical and physical ports), etc. To perform the lookup, the MFE compares the values for the packet data to the values in the flow entries. In general, due to the use of the logical context data, the packet should only match flow entries for one stage of one logical processing pipeline. In case the packet matches multiple flow entries in a particular pipeline stage, the flow entries may specify priorities, and the higher priority flow entry will be considered matched.

With a matched flow entry identified, the process 600 determines (at 615) actions to perform on the packet. As described above, in some embodiments the flow entries in the flow table follow a match-action format. That is, each flow entry specifies the match conditions and a set of actions to perform if the conditions are matched. These actions may involve modifying register values (e.g., context registers to indicate that a particular lookup stage in a processing pipeline has been completed), modifying packet addresses (e.g., the MAC address modification involved in standard IP routing), generating new packets (e.g., address resolution protocol packets), resubmitting the packet for additional processing, or other actions. In addition, rather than specifying these types of actions, some flow entries simply specify to perform a process executed by a module outside of the MFE.

As shown, the process next determines (at 620) whether the matched flow entry specifies such processing by a separate module. That is, the process determines whether the flow entry specifies actions for the MFE to perform (e.g., register value modification, resubmit, etc.) or for the MFE to offload processing to a separate module. As described above, some of these modules may be implemented as a series of non-processing-intensive if . . . else statements, or similar code (e.g., in C, C++, or a similar language). Such a module allows an entire stage in a logical processing pipeline (e.g., multiple lookup stages) to be represented by a single lookup over a set of one or more flow entries that specify to call the module for processing.

When the matched flow entry does not specify such processing offloading, the process 600 performs (at 625) the actions specified by the matched flow entry. As mentioned, these actions may include involve modifying register values (e.g., context registers to indicate that a particular lookup stage in a processing pipeline has been completed), modifying packet addresses (e.g., the MAC address modification involved in standard IP routing), generating new packets (e.g., address resolution protocol packets), resubmitting the packet for additional processing, or other actions.

If, on the other hand, the matched flow entry specifies a particular process to which the packet processing is offloaded, the process 600 sends (at 630) packet data to the specified separate module for processing. In some embodiments, the action specifies a function call or notation similar to a function call, with the parameters to send to the module specified. For instance, for a tunnel encapsulation module, some embodiments send an identified logical egress port. Similarly, for a module that performs ingress ACL and logical forwarding for a logical switch, some embodiments send the source and/or destination MAC address, logical ingress port, and possibly other data.

The separate module then performs its processing, and the process 600 subsequently receives (at 635) packet modification data. In some embodiments, this data specifies a set of actions to perform on the packet. Similar to the actions performed at operation 625, these actions may include modifying register values or packet addresses, generating new packets (e.g., address resolution protocol packets), resubmitting the packet for additional processing, or other actions. The process then performs (at 640) these specified actions to modify the packet as specified.

Next, the process determines (at 645) whether one of the specified actions is a resubmit. If either the matched flow entry or the packet processing module specifies to resubmit the packet, the process returns to the 605 to perform another lookup over the flow tables of the MFE. Otherwise, the process ends. In some embodiments, the MFE stores an entry in the kernel space flow cache (e.g., matching over the transport connection 5-tuple of source and destination IP address, source and destination transport layer port, and transport protocol) so that subsequent packets for the transport connection do not have to be sent through the more computationally-intensive user space process 600. In some embodiments, the actions specified for the packet by the process 600 are stored in the flow cache entry (or a subset of the actions that determine the final outcome for the packet).

The following presents one example of the difference in MFE first-packet processing between using multiple lookup stages at which specific operations are performed by the MFE and using a single lookup stage that calls a separate processing module to perform the required operations for the packet (or at least instruct the MFE as to which actions to perform for the packet).

Figure 7:
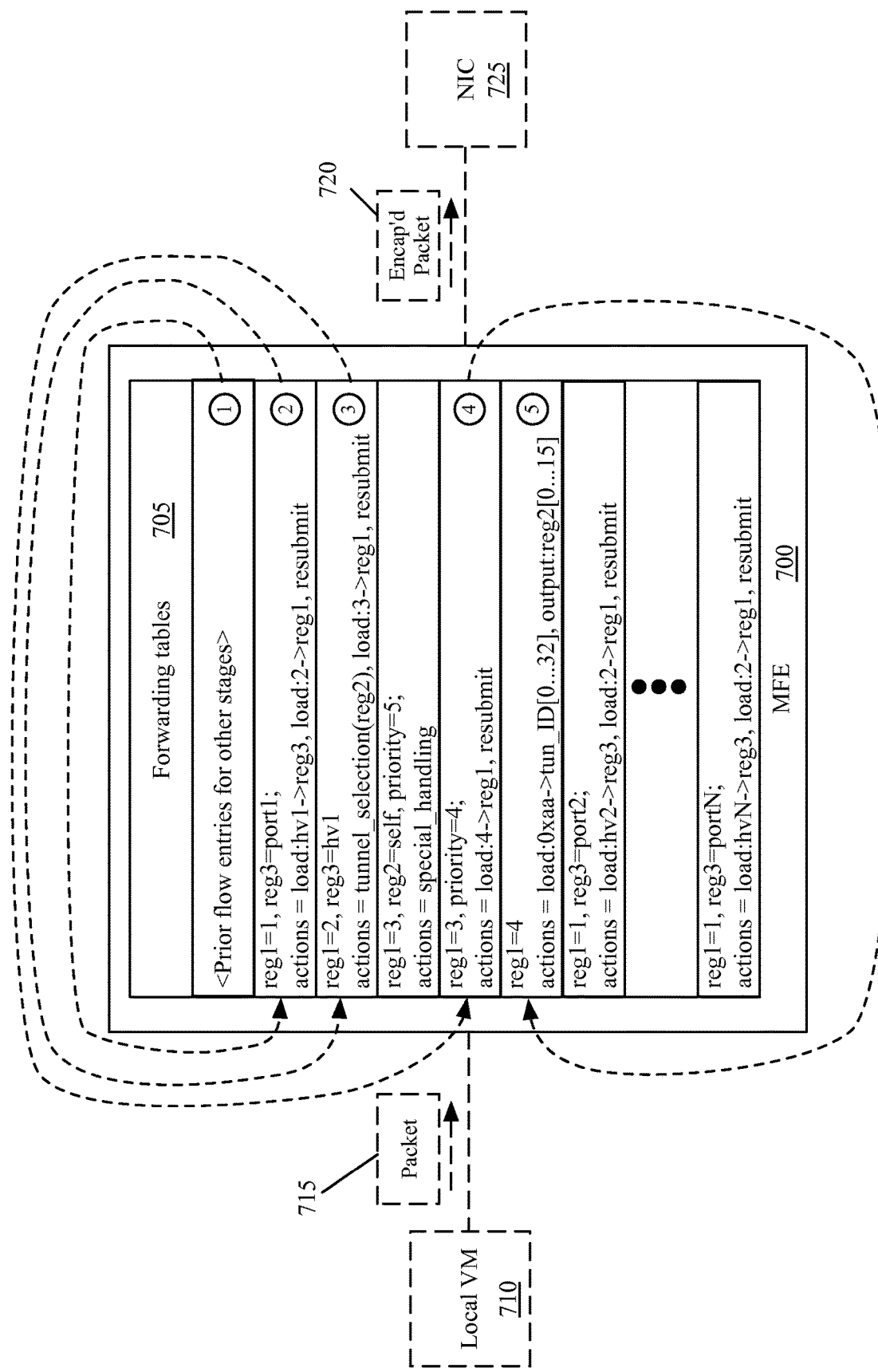

FIG. 7 conceptually illustrates the processing of a packet through a first forwarding table (or flow table) that includes flow entries for four stages of processing in order to encapsulate a packet in a tunnel and send the packet out to the physical network. As shown, FIG. 7 illustrates a forwarding table (or set of forwarding tables) 705, that includes numerous flow entries. These flow entries, as described above, are generated by a network controller and installed in the user space application of the MFE 700 in some embodiments. A local VM 710 that operates in the same host machine as the MFE 700 connects to the MFE (e.g., through a port on an integration bridge that is part of the kernel aspect of the MFE 700).

As shown, the VM 710 sends a packet 715 to the MFE 700. The packet 715 has a destination address (e.g., an IP address and/or MAC address). In this example, the packet 715 will be assumed to be a unicast packet, though some embodiments send broadcast or multi-cast packets through a tunnel in the same manner. As shown by the encircled 1, the packet 715 is initally processed by a set of flow entries that perform various packet processing stages, including logically forwarding the packet to a particular destination identified by a logical port. These flow entries may specify actions to be performed by the MFE 700 or call separate modules that identify actions for the MFE to perform.

Next, as shown by the encircled 2, the packet matches a flow entry that specifies (all flow entries are shown as simplified examples):

reg1=1, reg3=port1 actions=load:hv1->reg3, load:2->reg1, resubmit

In the match section of this flow entry, reg1 is a context register that indicates the current processing stage, and reg3 indicates the destination logical port for the packet. The actions specify to load a destination location (hv1) that corresponds to the logical port (port1) into reg3, and to set the context register reg1 to a new value (2) indicating the next stage. In addition, the flow entry specifies to resubmit the packet. In addition to the one flow entry shown, the forwarding tables 705 would also include flow entries for each other logical port of the current logical forwarding element, as these logical ports would correspond to different destinations.

The second flow entry matched during the tunnel sending stages, shown by the encircled 3, specifies:

reg1=2, reg3=hv1 actions=tunnel selection(reg2), load:3->reg1, resubmit

In the match section of this flow entry, reg1 again indicates the current processing stage, and reg3 indicates the destination identified in the previous processing stage. The actions specify to select a tunnel port (based on the location information in reg3) and load this tunnel port into reg3. In addition, the flow entry specifies to resubmit the packet. For this stage, the controller generates (and the MFE stores) one flow entry per destination MFE per logical switch. Some embodiments allow the tunnel encapsulation format to be chosen on a per logical forwarding element basis, so that the same destination MFE will have different tunnel encapsulations for different logical switches. Thus, for a given logical switch, on each MFE that implements the logical switch, there are O(LP)+O(H) flows for these two previous stages, where LP is the number of logical ports in the logical networks that the MFE implements and H is the number of MFEs to which the current MFE has a tunnel due to the logical switch.

The third flow entry matched during the tunnel sending stages, shown by the encircled 4, specifies:

reg1=3, priority=4 actions=load:4:reg1, resubmit

This again matches over the context register reg1, and specifies a priority of 4. The only actions specified are to load a new value (4) into reg1 and resubmit. This serves to differentiate the situation in which the destination logical port is on a different host machine (that actually requires a tunnel) as opposed to the following flow entry:

reg1=3, reg2=self, priority=5 actions=special handling

This flow entry, not matched by packet 710, indicates special handling for packets for which the destination is located on the same host as the MFE 700 (e.g., if the destination is the VM 710). As this special handling entry is not matched for the packet 715, the fourth flow entry matched during the tunnel sending stages, shown by the encircled 5, specifies:

reg1=4 actions=load:0xaa->tun_ID [0 . . . 32],output:
      reg2[0 . . . 15]

This flow entry performs the actual encapsulation and outputs the encapsulated packet 720 to the physical NIC 725 on the host machine.

As indicated, this results in not only numerous flow entries (which occupy both controller processing resources during generation and MFE memory space), but numerous lookup stages (which take up significant processing time).

Figure 8:
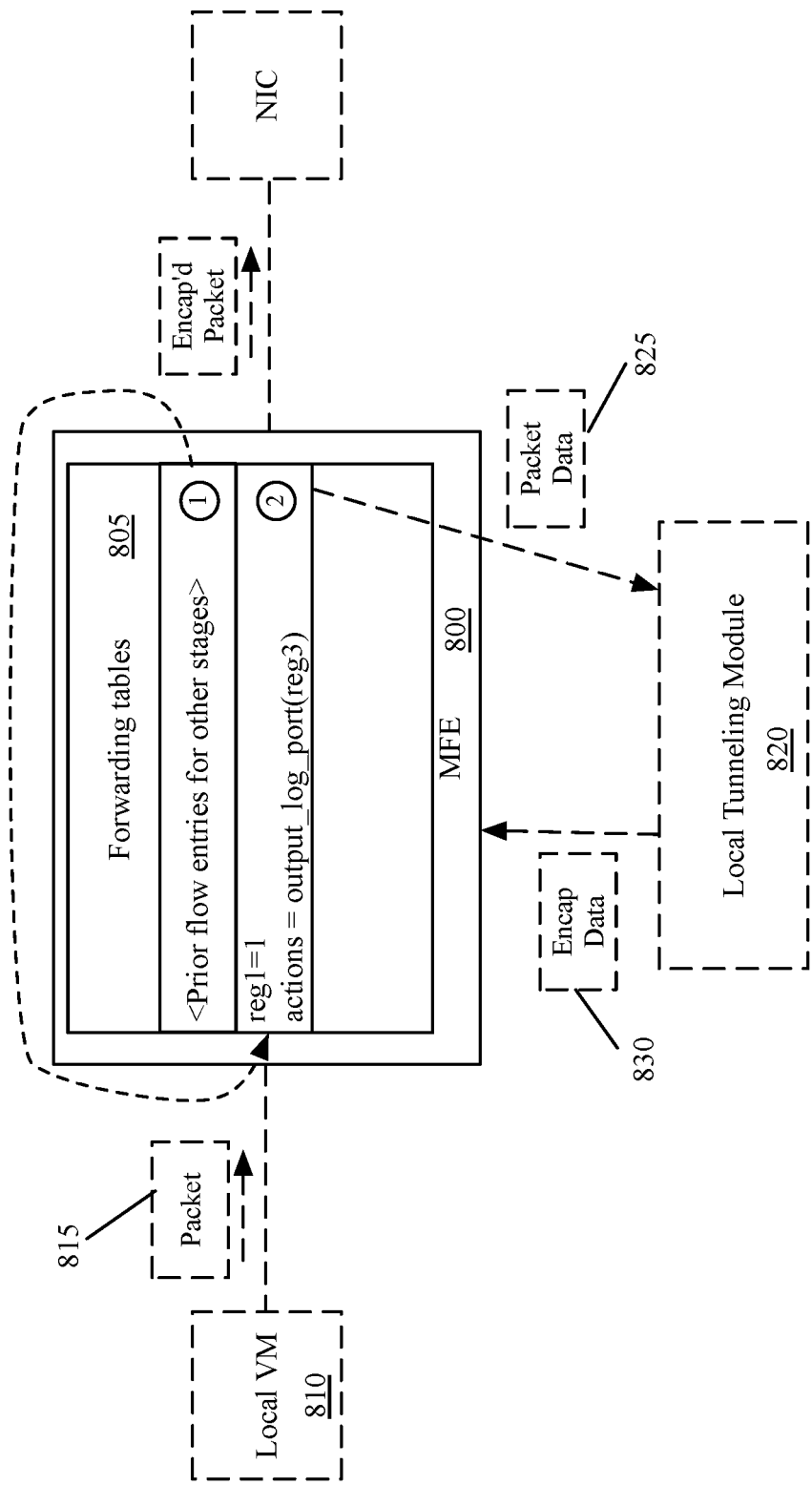
FIG. 8 conceptually illustrates the processing of a similar packet through a second forwarding table that includes a single flow entry for the tunnel sending operation.

With a high-level "output-to-logical port" action, only one flow entry is used for each MFE, as shown in FIG. 8. This figure conceptually illustrates the processing of a similar packet through a second forwarding table that includes a single flow entry for the tunnel sending operation. As shown, FIG. 8 illustrates a forwarding table 805 for an MFE 800. Again, as in the previous figure, a local VM 810 that operates in the same host machine as the MFE 800 sends a packet 815 to the MFE 800. Again, this is assumed to be a unicast packet, like the previous example.

As shown by the encircled 1, the packet 815 is initially processed by a set of flow entries that perform various packet processing stages, including logically forwarding the packet to a particular destination identified by a logical port. These flow entries may specify actions to be performed by the MFE 700 or call separate modules that identify actions for the MFE to perform.

Next, as shown by the encircled 2, the packet matches the single flow entry that specifies:

reg1=1 actions=output_log_port(reg3)

This flow entry specifies to call a separate module 820 that determines the location of a logical port identified by register 3, sets up the tunnel register (i.e., the packet encapsulation), and outputs to the corresponding tunnel port. As shown, the module receives packet data 825 from the MFE and returns encapsulation data 830 to the MFE (e.g., a set of actions). In some embodiments, the module returns the actions of tunnel_reg=reg3, output:1. Some embodiments implement the special handling for packets the destination of which is local via the same module, while other embodiments use a second flow entry for such cases.

The above is one example of the use of customized flow entries and corresponding modules to save processing time while also cutting down on the number of flow entries used for a particular logical forwarding element. However, not all processing pipeline stages can use such customized modules. For example, using such modules may not work in some embodiments if the decision-making typically handled by the flow entries does not easily translate into the standard programming language used, or if the module would require constant updating due to network stage changes.

The hybrid approach of some embodiments between the hardcoded MFE (e.g., ESX vSwitch) and the fully programmable MFE (OVS) combines flexibility without sacrificing throughput. In some embodiments, this design does not require any architectural change to a controller that generates and distributes the flow entries. In fact, the approach allows for the replacement of any number of sets of lookup stages with modules, depending on the user preference. In addition, the semantics of these high-level actions are free to evolve without modifying the MFE itself, as long as it is able to provide and maintain an application binary interface (ABI) for the action modules.

V. Combination of Lookup Stages

In some embodiments, another option to reduce the number of lookup stages is to combine lookup stages into a single stage, by essentially combining the flow entries. As mentioned above, to reduce the number of flow entries produced per lookup stage, some embodiments choose to split a stage into multiple stages. Specifically, as indicated, if a first stage has N flow entries and a second stage has M flow entries, combining these stages will result in M*N flow entries. However, doing so will also result in half of the lookups, thereby saving on processing time. As such, if the number of flow entries per lookup stage (or total) is not a concern, some embodiments merge multiple stages into one. To do so, some embodiments perform flow cross-producting. Specifically, this process essentially takes each possible combination of a flow entry from the first stage and a flow entry from the second stage, and generates a flow entry for the combination of these two flow entries. Thus, if the first stage matches over reg1 and the second stage matches over reg2, the combined stage will match over reg1 and reg2.

Figure 9:
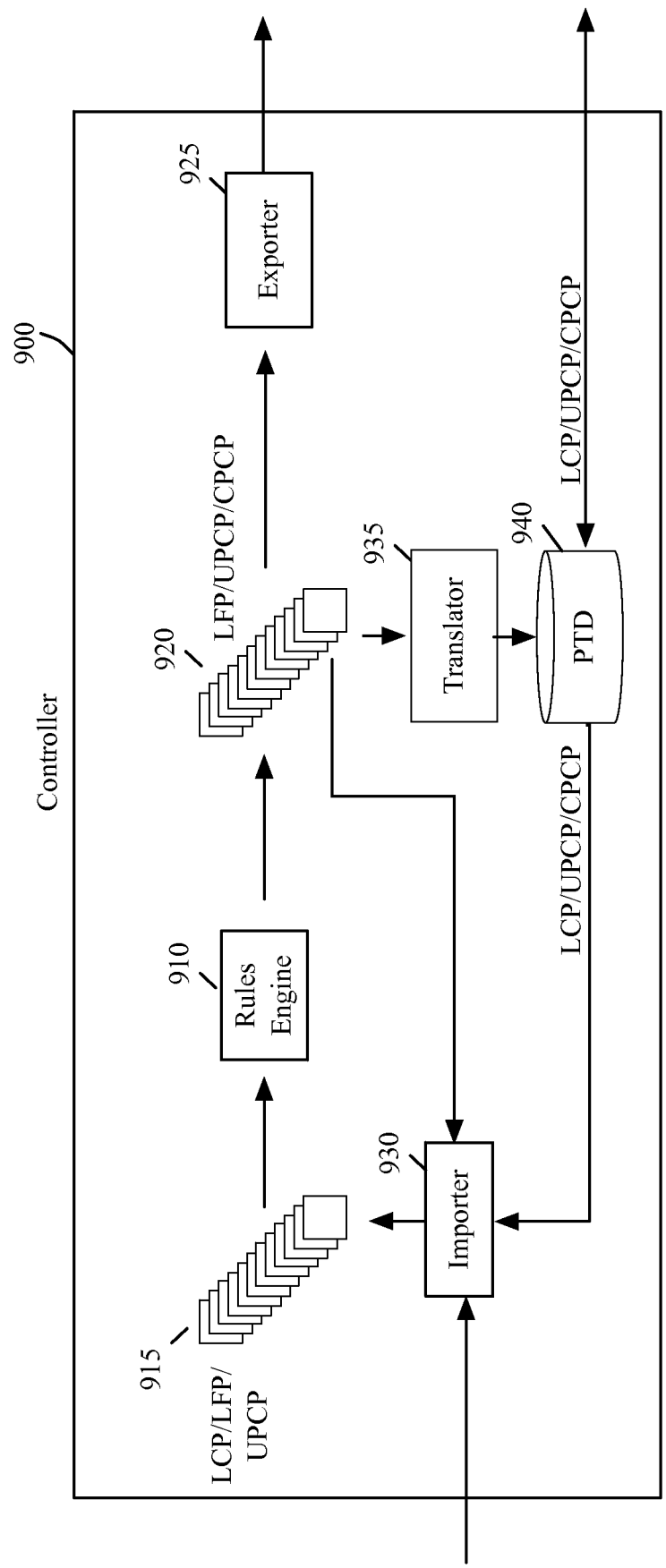
FIG. 9 illustrates an example architecture of a network controller.

To implement this combination of stages, in some embodiments the table mapping engine, or rules engine, that generates the flow entries at the network controller is modified. FIG. 9 illustrates an example architecture of a network controller (e.g., a centralized controller, chassis controller, etc.) 900. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to physical control plane data (e.g., universal physical control plane (UPCP) data), and/or UPCP data to be mapped to customized physical control plane (CPCP) data. The network controller 900, as shown, includes input tables 915, a rules engine 910, output tables 920, an importer 930, an exporter 935, a translator 935, and a persistent data storage (PTD) 940.

In addition to the input tables 915, the control application 900 includes other miscellaneous tables (not shown) that the rules engine 910 uses to gather inputs for its table mapping operations. These miscellaneous tables include constant tables that store defined values for constants that the rules engine 910 needs to perform its table mapping operations (e.g., the value 0, a dispatch port number for resubmits, etc.). The miscellaneous tables further include function tables that store functions that the rules engine 910 uses to calculate values to populate the output tables 925.

The rules engine 910 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 910 includes an event processor (not shown), several query plans (not shown), and a table processor (not shown). Each query plan is a set of rules that specifies a set of join operations that are to be performed upon the occurrence of an input table event. In some embodiments, the query plan for a first rules engine designed to generate flows that perform a particular set of actions as two stages will be different from the query plan for a second rules engine designed to generate flows that perform the same set of actions in one lookup stage. In some embodiments, the user of the controller (e.g., the datacenter manager) may choose which type of query plan should be in use based on the preferences of packet processing speed (fewer lookup stages is faster) versus memory usage in the MFE and controller (more lookup stages will have fewer flow entries).

The event processor of the rules engine 910 detects the occurrence of each such event. In some embodiments, the event processor registers for callbacks with the input tables for notification of changes to the records in the input tables 915, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 920.

Some embodiments use a variation of the datalog database language to allow application developers to create the rules engine for the controller, and thereby to specify the manner by which the controller maps logical forwarding elements to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine. To modify the query plans in order to combine the lookup stages, some embodiments modify the declaratory rules input into the compiler, while other embodiments modify the compiler.

Some embodiments designate the first join operation that is performed by the rules engine for an input event to be based on the logical forwarding element parameter. This designation ensures that the rules engine's join operations fail and terminate immediately when the rules engine has started a set of join operations that relate to a logical forwarding element that is not managed by the controller.

Like the input tables 915, the output tables 920 include tables with different types of data depending on the role of the controller 900. Specifically, the output tables 920 may include LFP, UPCP, or CPCP data depending on the computations performed by the rules engine 910 (i.e., depending on the input tables 915).

In some embodiments, the output tables 920 can be grouped into several different categories. For instance, in some embodiments, the output tables 920 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 925 to export the change to another controller or a MSE. An output table can be an RE input table, a RE output table, or both an RE input table and a RE output table.

The exporter 925 detects changes to the RE output tables of the output tables 920. In some embodiments, the exporter registers for callbacks with the RE output tables for notification of changes to the records of the RE output tables. In such embodiments, the exporter 925 detects an output table event when it receives notification from a RE output table that one of its records has changed.

In response to a detected output table event, the exporter 925 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MFEs, the exporter in some embodiments uses two channels. One channel is established using a switch control protocol (e.g., OpenFlow) for writing flow entries in the control plane of the MSE. The other channel is established using a database communication protocol (e.g., OVSDB, JSON) to send configuration data (e.g., port configuration, tunnel information).

In some embodiments, the controller 900 does not keep in the output tables 920 the data for logical forwarding elements that the controller is not responsible for managing (i.e., for logical forwarding elements managed by other logical controllers). However, such data is translated by the translator 935 into a format that can be stored in the PTD 940 and is then stored in the PTD. The PTD 940 propagates this data to PTDs of one or more other controllers so that those other controllers that are responsible for managing the logical datapath sets can process the data.

In some embodiments, the controller also brings the data stored in the output tables 920 to the PTD for resiliency of the data. Therefore, in these embodiments, a PTD of a controller has all the configuration data for all logical forwarding elements managed by the network control system. That is, each PTD contains the global view of the configuration of the logical networks of all users.

The importer 930 interfaces with a number of different sources of input data and uses the input data to modify or create the input tables 910. The importer 920 of some embodiments receives the input data from another controller. The importer 920 also interfaces with the PTD 940 so that data received through the PTD from other controller instances can be translated and used as input data to modify or create the input tables 910. Moreover, the importer 920 also detects changes with the RE input tables in the output tables 930.

As mentioned, in order to combine two lookup stages, some embodiments modify the table mapping engine of the controller that generates the flow entries. The following provides a simplified example of an operation that can be implemented over one lookup stage or two lookup stages. The different resulting forwarding tables are shown in FIGS. 10 and 11, which conceptually illustrate the processing of a packet through forwarding tables.

Figure 10:
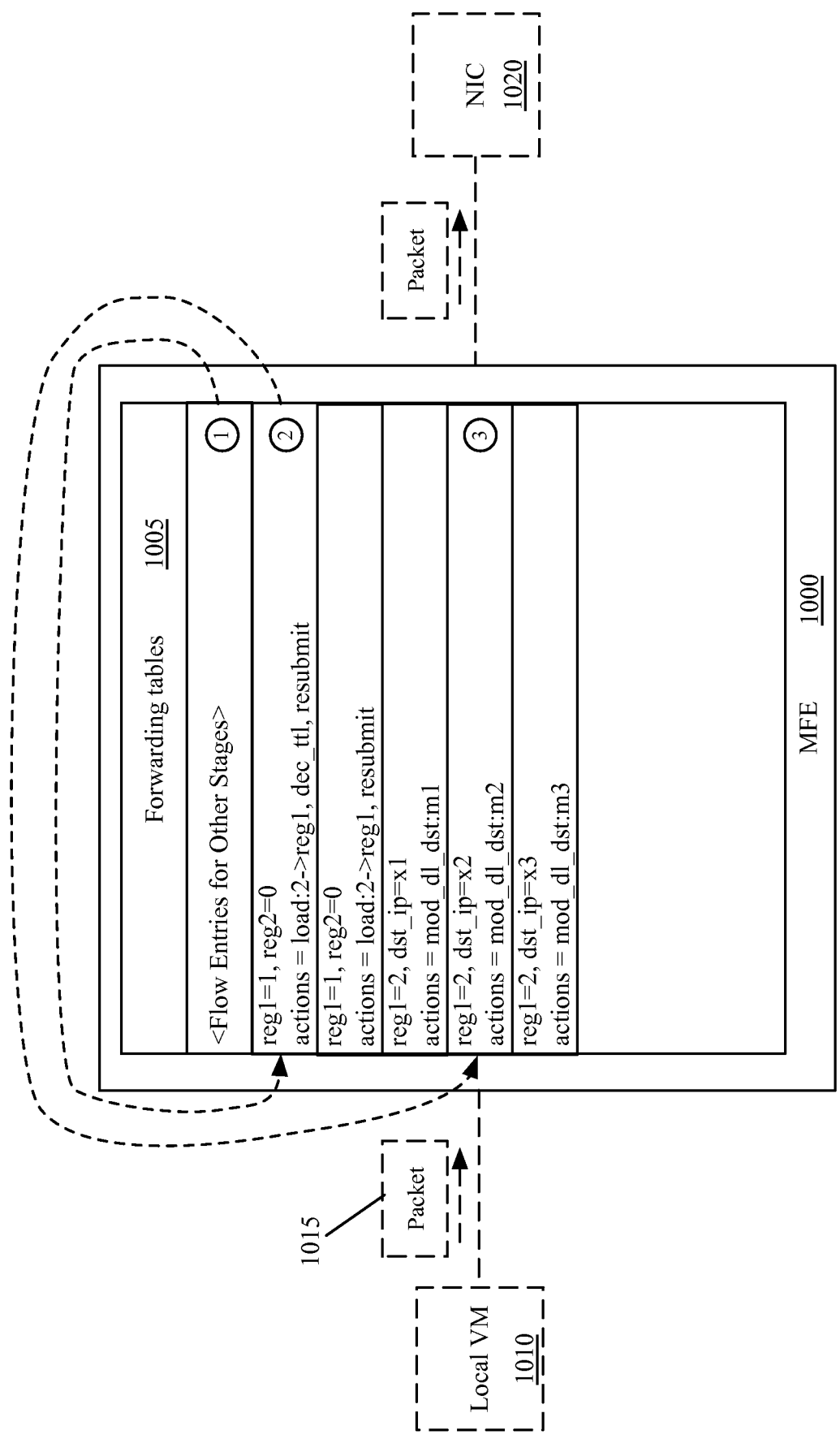
FIGS. 10 and 11 conceptually illustrate the processing of a packet through forwarding tables.
Figure 11:
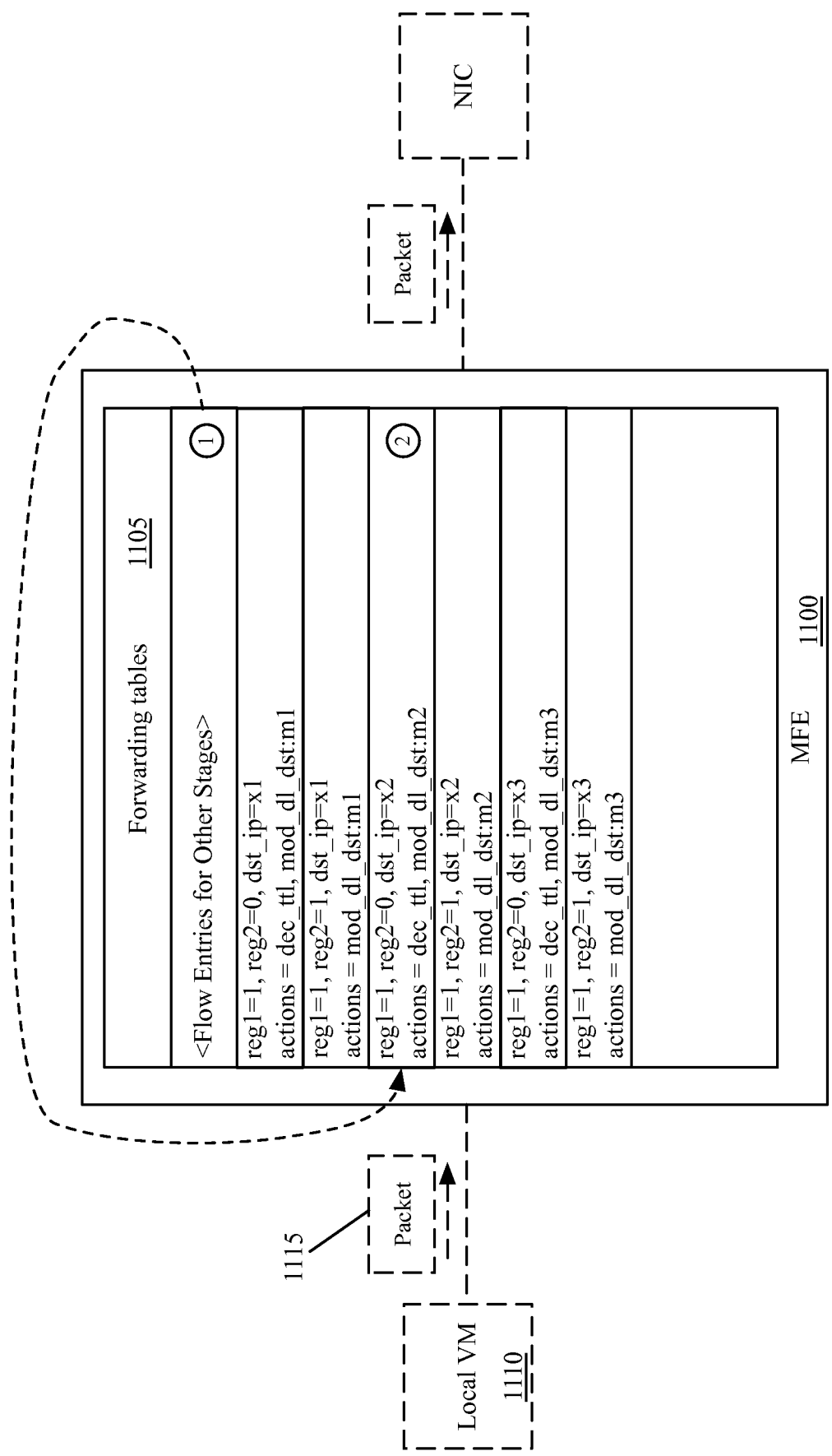

Specifically, FIG. 10 illustrates the processing of a packet through a first forwarding table (flow table) that includes flow entries for two stages of performing layer 3 routing on a packet. As with FIGS. 7 and 8, FIG. 10 illustrates a forwarding table 1005 for an MFE 1000, and a local VM 1010 sends a packet 1015 to the MFE 1000. As in the previous examples, this is assumed to be a unicast packet.

As shown by the encircled 1, the packet 1015 is initially processed by a set of flow entries that perform various packet processing stages, such as initial logical switch processing that forwards the packet (logically) to a logical router. These flow entries may specify actions to be performed by the MFE 1000 or call separate modules, as described in the previous section.

The first of the two stages highlighted includes two flow entries in the forwarding table 1005.

reg1=1, reg2=0 actions=load:2->reg 1, dec_ttl, resubmit reg1=1, reg2=1 actions=load:2->reg1, resubmit These flow entries either decrement the time to live (ttl) of the packet if reg2=0, or do not do so if reg2=1. In the example, as shown by the encircled 2, the packet matches the first flow entry, and the ttl is decremented.

The second stage modifies the destination MAC address of the packet based on the destination IP address. In this case, there are only three possible destination IP addresses, and therefore only three flow entries.

reg1=2, dst_ip=x1 actions=mod_dl_dst: m1 reg1=2, dst_ip=x2 actions=mod_dl_dst: m2 reg1=2, dst_ip=x3 actions=mod_dl_dst: m3

As indicated by the encircled 3, the packet 1015 has a destination IP address of x2, and therefore the second of these flow entries is matched, causing the MFE 1000 to set the destination MAC address to m2. These The packet is then output to the NIC 1020 (e.g., via an output action that could also be part of the flow entry, or via a separate flow entry after a resubmit action that is part of the flow entry.

In the example of FIG. 11, the forwarding table 1105 of the MFE 1100 has six flow entries for a combined single lookup stage that performs the same function as the two lookup stages shown in FIG. 10. Specifically, after receiving a packet 1115 from the local VM 1110, and performing the initial processing indicated by the encircled 1, the packet then enters a lookup stage having six flow entries (the two flow entries of the first stage of FIG. 10 multiplied by the three flow entries of the second stage). This "cross-producting" of the flow entries results in the following flow entries:

reg1=1, reg2=0, dst_ip=x1 actions=dec_ttl,mod_dl_dst: m1 reg1=1, reg2=1, dst_ip=x1 actions=mod_dl_dst:m1 reg1=1, reg2=0, dst_ip=x2 actions=dec_ttl,mod_dl_dst: m2 reg1=1, reg2=1, dst_ip=x2 actions=mod_dl_dst: m2 reg1=1, reg2=0, dst_ip=x3 actions=dec_ttl,mod_dl_dst:m3 reg1=1, reg2=1, dst_ip=x3 actions=mod_dl_dst:m3

As indicated by the encircled 2, the packet 1115 has a destination IP address of x2, and the reg1 value is 0, so that the MFE 1000 decrements the ttl and sets the destination MAC address to m2, requiring only one lookup stage rather than two lookup stages.

One useful property of this approach is that it achieves separation of concerns. That is, developers can continue to enjoy the modularity benefit of multiple stages, while runtime performance is achieved by "compressing" multiple steps into one behind the scene without involvement of the developers. At one extreme, one could choose to compress all stages into one, thus achieving a single lookup for each packet, but the ideal lookup performance would come with tremendous increase in the flow entry count.

Some embodiments avoid having too many flow entries for a compressed lookup stage. For instance, when crossproducting two lookup steps would result in too many flow entries (more than a threshold number of flow entries, or more than a threshold increase in the flow entries) in the combined lookup stage, then the controller (or the developer of the table mapping engine) does not combine these two stages. The controller (or developer) only combines lookup stages that would result in a combined lookup stage having less than the threshold number of flow entries.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
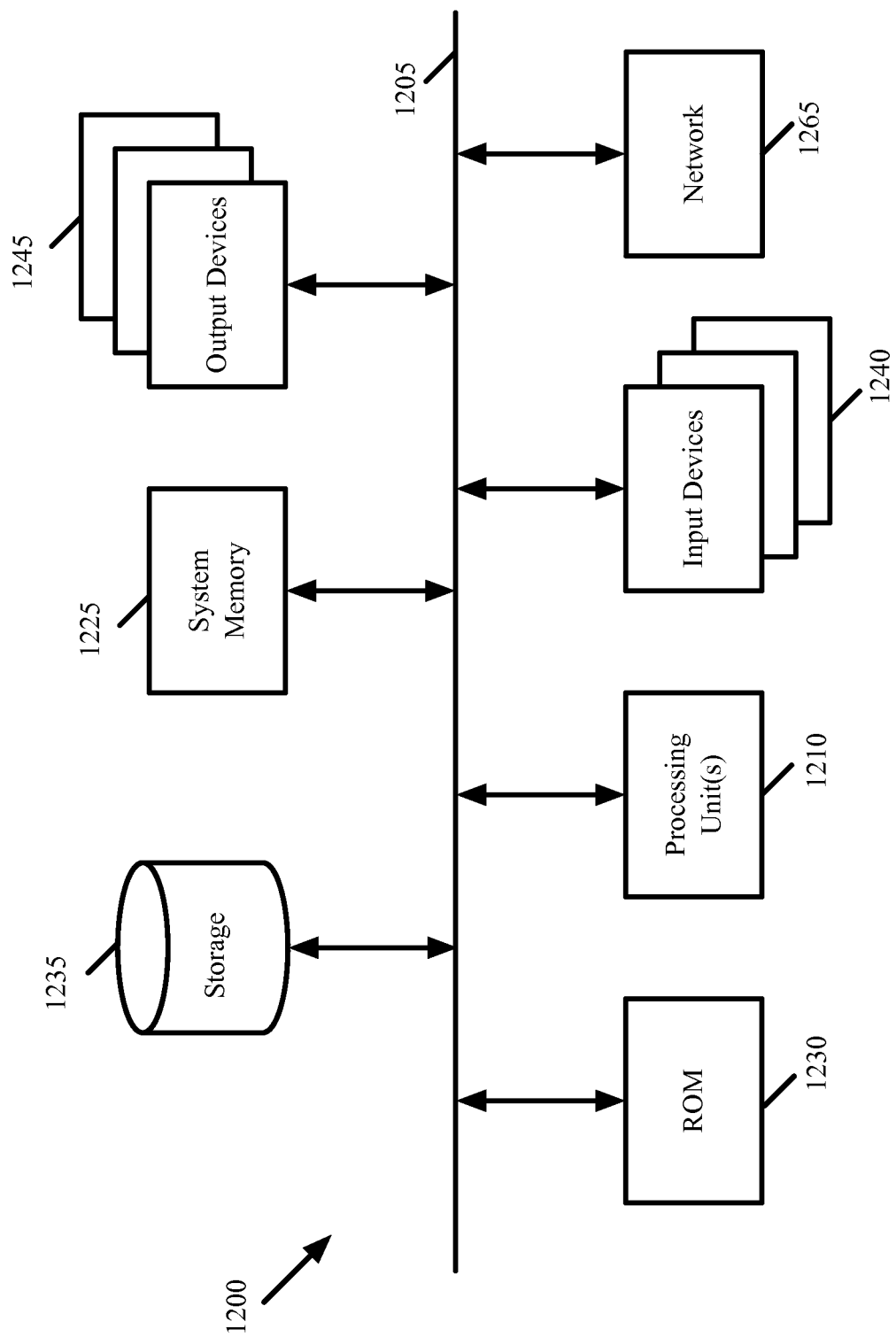
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of processing packets for a managed forwarding element that executes in a host machine to forward packets in a network, the method comprising:
    performing a lookup operation that searches entries in a forwarding table to identify an entry that matches a packet of a data flow, the identified entry specifying a high-level action to perform on the matched packet;
    providing data regarding the matched packet to a module that executes separately from the managed forwarding element on the same host machine as the managed forwarding element, wherein the module performs a set of processes in order to identify a set of low-level actions for the managed forwarding element to perform on the matched packet to accomplish the high-level action specified in the identified entry of the forwarding table without additional lookups into the forwarding table;
    receiving data from the separate module that specifies the set of low-level actions for the managed forwarding element to perform on the matched packet; and
    performing the set of low-level actions on the matched packet in order to further process the matched packet.

2. The method of claim 1, wherein the matched packet is a first packet in the data flow.

3. The method of claim 2 further comprising caching the set of low-level actions for use in processing subsequent packets in the data flow.

4. The method of claim 1, wherein the separate module comprises a function executing as object code.

5. The method of claim 4, wherein the high-level action specifies a call to the function.

6. The method of claim 1, wherein the packet matches the identified entry based on one or more register values stored for the packet by the managed forwarding element.

7. The method of claim 1, wherein the module identifies the set of low-level actions based on data previously identified for the packet by the managed forwarding element.

8. The method of claim 1, wherein the high-level action is outputting the matched packet to a logical port, wherein providing the data regarding the matched packet to the module comprises providing a logical egress port of a logical forwarding element.

9. A non-transitory machine readable medium storing a managed forwarding element which when executed by at least one processing unit of a host machine to forward packets in a network, the managed forwarding element comprising sets of instructions for:
    performing a lookup operation that searches entries in a forwarding table to identify an entry that matches a packet of a data flow, the identified entry specifying a high-level action to perform on the matched packet;
    providing data regarding the matched packet to a module that executes separately from the managed forwarding element on the same host machine as the managed forwarding element, wherein the module performs a set of processes in order to identify a set of low-level actions for the managed forwarding element to perform on the matched packet to accomplish the high-level action specified in the identified entry of the forwarding table without additional lookups into the forwarding table;
    receiving data from the separate module that specifies the set of low-level actions for the managed forwarding element to perform on the matched packet; and
    performing the set of low-level actions on the packet in order to further process the matched packet.

10. The non-transitory machine readable medium of claim 9, wherein the matched packet is a first packet in the data flow.

11. The non-transitory machine readable medium of claim 10, wherein the managed forwarding element further comprises a set of instructions for caching the set of low-level actions for use in processing subsequent packets in the data flow without the use of the separate module.

12. The non-transitory machine readable medium of claim 9, wherein the separate module comprises a function executing as object code.

13. The non-transitory machine readable medium of claim 12, wherein the high-level action specifies a call to the function.

14. The non-transitory machine readable medium of claim 9, wherein the packet matches the identified entry based on one or more register values stored for the packet by the managed forwarding element.

15. The non-transitory machine readable medium of claim 9, wherein the module identifies the set of low-level actions based on data previously identified for the packet by the managed forwarding element.

16. The non-transitory machine readable medium of claim 9, wherein the high-level action is outputting the matched packet to a logical port, wherein the set of instructions for providing the data regarding the matched packet to the module comprises a set of instructions for providing a logical egress port of a logical forwarding element.

17. The non-transitory machine readable medium of claim 16, wherein the received data from the separate module comprises instructions to encapsulate the matched packet in a particular tunnel to which the logical egress port corresponds.

18. The non-transitory machine readable medium of claim 16, wherein the managed forwarding element further comprises a set of instructions for performing logical forwarding to identify the logical egress port prior to performing the lookup operation.

* * * * *